(12) United States Patent
Park

(10) Patent No.: US 12,483,379 B2
(45) Date of Patent: Nov. 25, 2025

(54) ELECTRONIC DEVICE AND OPERATING METHOD OF ELECTRONIC DEVICE

(71) Applicant: SAMSUNG ELECTRONICS CO., LTD., Suwon-si (KR)

(72) Inventor: Donguk Park, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 297 days.

(21) Appl. No.: 17/380,842

(22) Filed: Jul. 20, 2021

(65) Prior Publication Data

US 2022/0231829 A1 Jul. 21, 2022

(30) Foreign Application Priority Data

Jan. 20, 2021 (KR) .................. 10-2021-0008063

(51) Int. Cl.
*H04L 7/033* (2006.01)
*G09G 3/20* (2006.01)
*H04L 7/04* (2006.01)

(52) U.S. Cl.
CPC .............. *H04L 7/033* (2013.01); *G09G 3/20* (2013.01); *H04L 7/04* (2013.01); *G09G 2310/0297* (2013.01); *G09G 2310/061* (2013.01); *G09G 2330/021* (2013.01); *G09G 2360/08* (2013.01)

(58) Field of Classification Search
CPC .. H04L 7/033; H04L 7/04; G09G 3/20; G09G 2310/0297; G09G 2310/061; G09G 2310/021; G09G 2360/08
See application file for complete search history.

(56) References Cited

U.S. PATENT DOCUMENTS

| 6,617,916 | B1 | 9/2003 | Kurotsu |
| 7,212,185 | B2 | 5/2007 | Yanagi et al. |
| 9,153,196 | B2 | 10/2015 | Hong et al. |
| 9,679,527 | B2 | 6/2017 | Hwang et al. |
| 9,755,818 | B2 | 9/2017 | Sengoku |
| 10,162,402 | B2 | 12/2018 | Seu et al. |
| 2015/0296452 | A1* | 10/2015 | Hu ................ H04W 52/0209 375/376 |
| 2016/0077579 | A1* | 3/2016 | Gulati ................ G06F 1/3296 713/323 |
| 2017/0116954 | A1* | 4/2017 | Baek .................... G09G 3/2096 |
| 2018/0081612 | A1* | 3/2018 | Lee ......................... G09G 5/14 |

(Continued)

FOREIGN PATENT DOCUMENTS

KR 101480842 B1 1/2015

*Primary Examiner* — Patrick N Edouard
*Assistant Examiner* — Eboni N Giles
(74) *Attorney, Agent, or Firm* — Fish & Richardson P.C.

(57) ABSTRACT

An electronic device including a control circuit that receives a first signal from an external device and outputs a second signal based on the first signal, a phase locked loop circuit that outputs a first clock signal, a physical circuit that receives the first clock signal from the phase locked loop circuit and the second signal from the control circuit, and outputs a third signal based on the first clock signal and the second signal, and a driving circuit that outputs a transmit signal based on the third signal. The control circuit is operable in a high-speed mode and a low-power mode, and the control circuit powers off the phase locked loop circuit in the low-power mode and powers on the phase locked loop circuit in the high-speed mode.

14 Claims, 17 Drawing Sheets

(56) References Cited

U.S. PATENT DOCUMENTS

2020/0168175 A1\* 5/2020 Tsuchi ................. G09G 3/3685
2020/0312271 A1\* 10/2020 Derr ...................... G06F 3/1431
2021/0193236 A1\* 6/2021 Cai ...................... H03K 17/223

\* cited by examiner

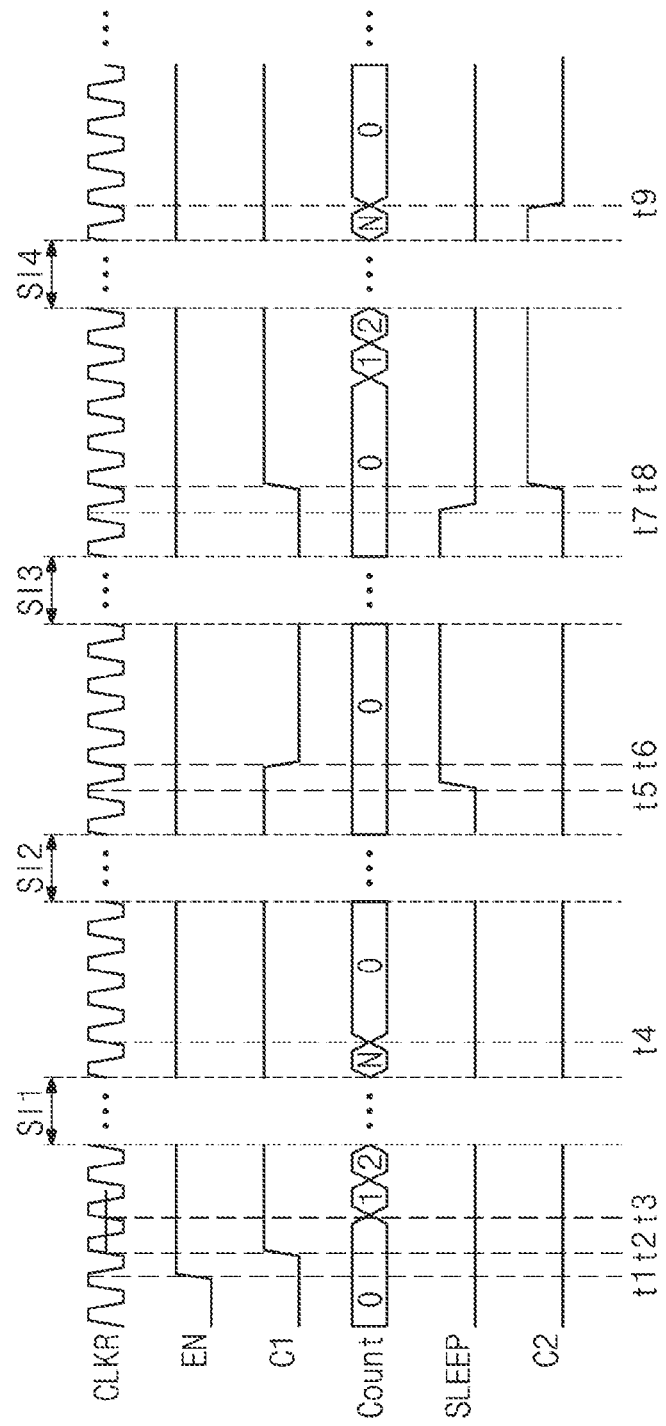

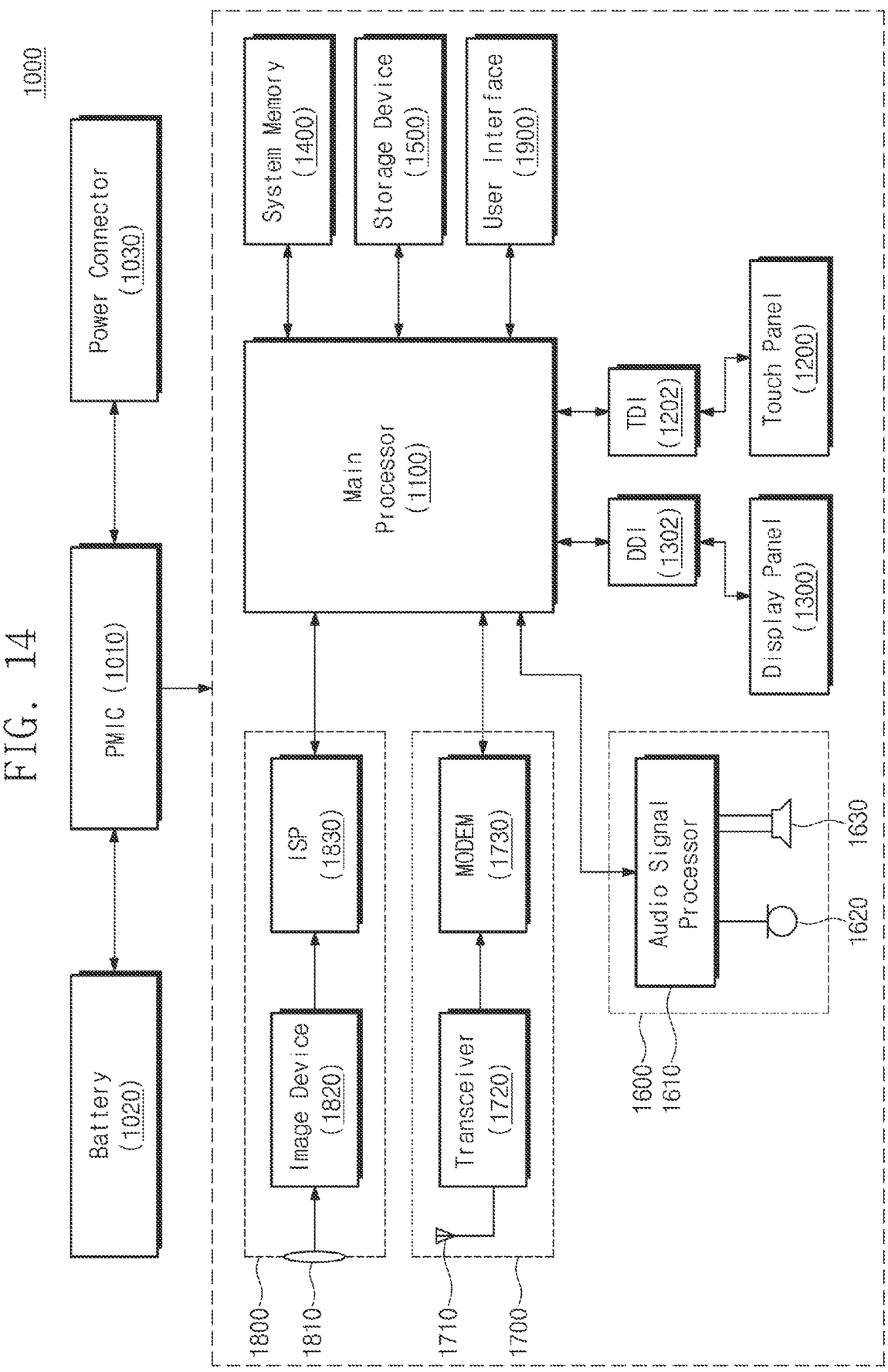

ELECTRONIC DEVICE AND OPERATING METHOD OF ELECTRONIC DEVICE

CROSS-REFERENCE TO RELATED APPLICATIONS

A claim for priority under 35 U.S.C. § 119 is made to Korean Patent Application No. 10-2021-0008063 filed on Jan. 20, 2021, in the Korean Intellectual Property Office, the entirety of which is hereby incorporated by reference.

BACKGROUND

The present disclosure relates to an electronic device, and more particularly to electronic devices transmitting a signal with low power consumption and operating methods of the electronic devices.

An electronic device may exchange signals with another electronic device based on various types of communication protocols. Electronic devices that are independent of each other and that communicate with each other based on communication protocols may include for example computers, smartphones, and smart pads, or the like. On the other hand, electronic devices that communicate with each other based on communication protocols may be circuit blocks included in a system-on-chip or an integrated circuit. Communication protocols are being researched and developed to exchange signals with low power consumption and at an improved speed.

Some communication protocols may be used to exchange signals between various kinds of electronic devices, and thus may be implemented to convey various formats or kinds of data. Other communication protocols may be used to exchange signals between electronic devices of a specific kind, and thus may be implemented to convey a specific format or kind of data.

In the case where specific electronic devices are implemented to exchange a specific format or kind of data, the performance of the specific electronic devices may be further improved based on a characteristic of a specific format or kind of data.

SUMMARY

Embodiments of the inventive concepts provide an electronic device that transmits a signal with low power consumption, and an operating method of the electronic device.

Embodiments of the inventive concepts provide an electronic device including a control circuit that receives a first signal from an external device and outputs a second signal based on the first signal; a phase locked loop circuit that outputs a first clock signal; a physical circuit that receives the first clock signal from the phase locked loop circuit and the second signal from the control circuit, and that outputs a third signal based on the first clock signal and the second signal; and a driving circuit that outputs a transmit signal based on the third signal. The control circuit is operable in a high-speed mode and a low-power mode, and the control circuit powers off the phase locked loop circuit in the low-power mode and powers on the phase locked loop circuit in the high-speed mode.

Embodiments of the inventive concepts further provide an electronic device including a control circuit that receives a first signal from an external device and outputs a second signal based on the first signal; a phase locked loop circuit that outputs a first clock signal; a reference voltage generator that generates a reference voltage; a physical circuit that receives the first clock signal from the phase locked loop circuit, the second signal from the control circuit, ands the reference voltage from the reference voltage generator, and that outputs a third signal based on the first clock signal, the second signal, and the reference voltage; and a driving circuit that receives the reference voltage and the third signal, and that outputs a transmit signal based on the reference voltage and the third signal. The control circuit is operable in a high-speed mode and a low-power mode, and the control circuit powers off the reference voltage generator in the low-power mode and powers on the reference voltage generator in the high-speed mode.

Embodiments of the inventive concepts also provide an operating method of an electronic device including a transmitter and a receiver, the method including entering, at the transmitter, a high-speed mode; transmitting, at the transmitter, an image frame to the receiver in the high-speed mode; entering, at the transmitter, a low-power mode during a blank interval; powering off, at the receiver, at least one component in response to the transmitter entering the low-power mode; powering on, at the receiver, the at least one component before the blank interval at the transmitter ends; and entering, at the transmitter, the high-speed mode in response to ending of the blank interval.

Embodiments of the inventive concepts still further provide an electronic device including a control circuit that receives a first signal from an external device and outputs a second signal based on the first signal; a phase locked loop circuit that outputs a first clock signal; a reference voltage generator that generates a reference voltage; a physical circuit that receives the first clock signal from the phase locked loop circuit, the second signal from the control circuit, and the reference voltage from the reference voltage generator, and that outputs a third signal based on the first clock signal, the second signal and the reference voltage; and a driving circuit that outputs a transmit signal based on the third signal. The control circuit is operable in a high-speed mode and a low-power mode, and the control circuit powers off the phase locked loop circuit and the reference voltage generator in the low-power mode, and powers on the phase locked loop circuit and the reference voltage generator in the high-speed mode.

BRIEF DESCRIPTION OF THE FIGURES

The above and other objects and features of the inventive concepts will become apparent in view of the following detailed description of embodiments as made with reference to the accompanying drawings.

FIG. 7B illustrates an example in which a control circuit controls a reference generator.

FIG. 14 illustrates an electronic device according to a third embodiment of the inventive concepts.

DETAILED DESCRIPTION

Figure 1:
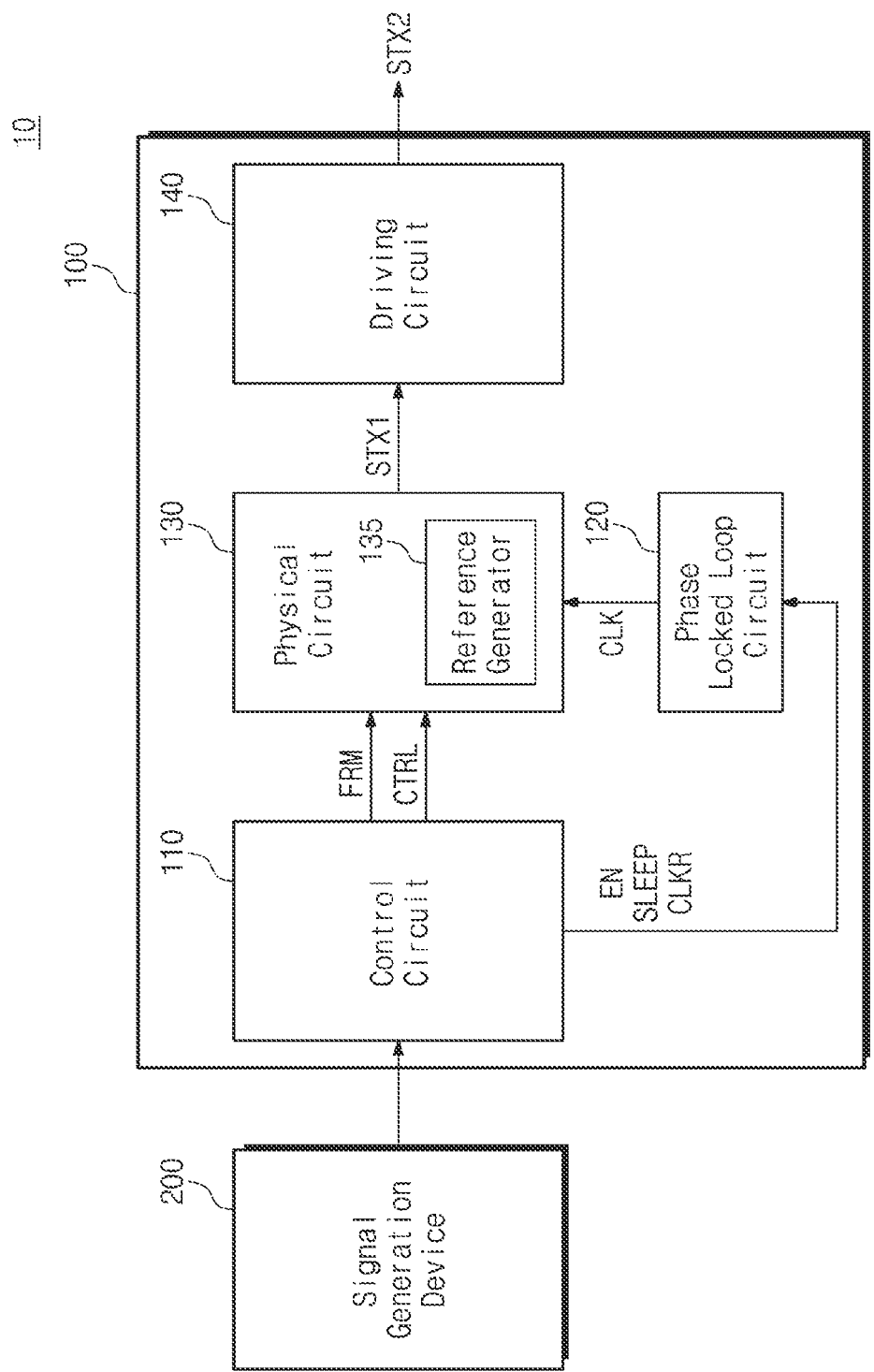
FIG. 1 illustrates an electronic device according to a first embodiment of the inventive concepts.

FIG. 1 illustrates an electronic device 10 according to a first embodiment of the inventive concepts. The electronic device 10 may include a transmitting device 100 and a signal generation device 200. The transmitting device 100 may transmit a signal generated by the signal generation device 200, based on a specific communication protocol. The signal generation device 200 may generate a signal to be transmitted through the transmitting device 100. For example, the signal generation device 200 may include an image sensor configured to generate an image frame or a processor configured to transmit an image frame.

The transmitting device 100 may include a control circuit 110, a phase locked loop circuit 120, a physical circuit 130, and a driving circuit 140. The control circuit 110 may convert the signal generated by the signal generation device 200 into an image frame FRM so as to be transferred to the physical circuit 130. For example, the control circuit 110 may be implemented to include at least a part of a link layer.

The control circuit 110 may provide an enable signal EN, a sleep signal SLEEP, and a reference clock signal CLKR to the phase locked loop circuit 120 to control the phase locked loop circuit 120. Also, the control circuit 110 may provide a control signal CTRL to the physical circuit 130 to control the physical circuit 130.

The phase locked loop circuit 120 may receive the enable signal EN, the sleep signal SLEEP, and the reference clock signal CLKR from the control circuit 110. The phase locked loop circuit 120 may be powered on in response to activation of the enable signal EN and may provide a clock signal CLK to the physical circuit 130.

The phase locked loop circuit 120 may be powered off in response to activation of the sleep signal SLEEP and may enter a low-power mode. In the low-power mode, the phase locked loop circuit 120 may not generate the clock signal CLK and thus may reduce power consumption. The phase locked loop circuit 120 may be powered on in response to deactivation of the sleep signal SLEEP and may enter a high-speed mode.

In the high-speed mode, the phase locked loop circuit 120 may generate the clock signal CLK in response to the reference clock signal CLKR to allow the physical circuit 130 to perform communication. The phase locked loop circuit 120 is illustrated in FIG. 1 as a component independent of the physical circuit 130, but in other embodiments the phase locked loop circuit 120 may be implemented to be included within the physical circuit 130.

The physical circuit 130 may receive the image frame FRM and the control signal CTRL from the control circuit 110. Also, the physical circuit 130 may receive the clock signal CLK from the phase locked loop circuit 120.

The physical circuit 130 may change an operating mode in response to the control signal CTRL. For example, the physical circuit 130 may enter one of the high-speed mode and the low-power mode in response to the control signal CTRL. In the high-speed mode, the physical circuit 130 may output the image frame FRM as a first transmit signal STX1 based on the clock signal CLK. In the low-power mode, the physical circuit 130 may output any other information other than the image frame FRM as the first transmit signal STX1, in a form different from that in the high-speed mode.

The physical circuit 130 may include a reference generator 135. The reference generator 135 may generate a reference voltage necessary to generate voltages defined by a communication protocol of the transmitting device 100 or may generate a reference current necessary to generate currents defined by the communication protocol. To convey the inventive concepts, the reference generator 135 will be subsequently described as generating the reference voltage, however in other embodiments the reference generator 135 may generate the reference current.

In the high-speed mode, the reference generator 135 may be powered on in response to the control signal CTRL and may be implemented to generate the reference voltage. In the low-power mode, the reference generator 135 may be powered off in response to the control signal CTRL and may be implemented to stop generating the reference voltage. In the high-speed mode, the physical circuit 130 outputs the first transmit signal STX1 based on the clock signal CLK, the image frame FRM, and the reference voltage generated by the reference generator 135.

In FIG. 1 the reference generator 135 is included within the physical circuit 130, however in other embodiments the reference generator 135 may be provided outside the physical circuit 130 as a component independent of the physical circuit 130. The reference generator 135 may be configured to provide the reference voltage to the driving circuit 140 as well as the physical circuit 130. The reference generator 135 may be characterized as a "reference voltage generator" in terms of generating the reference voltage.

The driving circuit 140 may receive the first transmit signal STX1 from the physical circuit 130. The driving circuit 140 may change the first transmit signal STX1 to a second transmit signal STX2 complying with the communication protocol of the transmitting device 100 and may transmit the second transmit signal STX2 to an external device (e.g., a receiving device). For example, the driving circuit 140 may transmit the second transmit signal STX2 in the form of signals of at least two phases in the high-speed mode. In the low-power mode, the driving circuit 140 may transmit the second transmit signal STX2 in the form of signals of a single phase, which are independent of each other. In the high-speed mode, the driving circuit 140 outputs the second transmit signal STX2 based on the first transmit signal STX1 and the reference voltage generated by the reference generator 135.

In an embodiment, the physical circuit 130 and the driving circuit 140 may be implemented to constitute a physical layer. The physical layer may consist of electronic circuit transmission technologies and hardware that enable transmission and/or reception of electronic or other signals, and electrical and physical interface to the transmission medium, and the network physical circuit 130 among other things may for example perform encoding, as should be well understood in the art.

Figure 2:
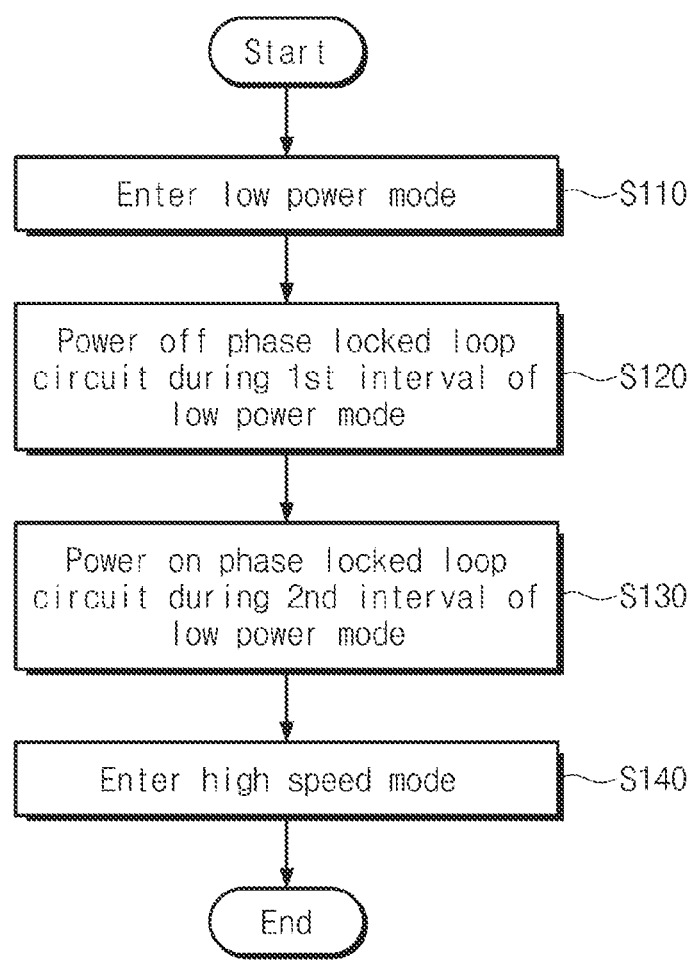
FIG. 2 illustrates a flow chart explanatory of an operating method of an electronic device according to embodiments of the inventive concepts.

FIG. 2 illustrates an operating method of the electronic device 10 according to embodiments of the inventive concepts. Referring to FIGS. 1 and 2, in operation S110, the electronic device 10 enters the low-power mode. In operation S120, in response to entering the low-power mode, the control circuit 110 of the transmitting device 100 in the electronic device 10 powers off the phase locked loop circuit 120 during a first time interval of the low-power mode. Accordingly, the power consumption of the electronic device 10 may decrease.

In operation S130, in response to the first time interval of the low-power mode elapsing, the control circuit 110 powers on the phase locked loop circuit 120 during a second time interval of the low-power mode. For example, the phase locked loop circuit 120 may lock a phase of the clock signal CLK during the second time interval.

In operation S140, in response to the second time interval of the low-power mode elapsing, the electronic device 10 enters the high-speed mode. In the high-speed mode, the electronic device 10 may transmit the second transmit signal STX2 to the external device by using the clock signal CLK.

As described above, the electronic device 10 may reduce power consumption by turning off the phase locked loop circuit 120 in the low-power mode. Also, the electronic device 10 may power on the phase locked loop circuit 120 before the second time interval of the low-power mode elapses so that the phase locked loop circuit 120 locks the phase of the clock signal CLK before entering the high-speed mode. Accordingly, an operation in the high-speed mode is not affected by the phase locked loop circuit 120 being powered off in the low-power mode.

In an embodiment, the control circuit 110 may be implemented to include at least a part of a link layer. The signal generation device 200 may be an image sensor configured to generate the image frame FRM, or a processor configured to transmit the image frame FRM, for the purpose of displaying the image frame FRM.

In the high-speed mode, the transmitting device 100 may transmit one image frame FRM as the second transmit signal STX2, and may then have a vertical blank interval before transmitting a next image frame FRM as the second transmit signal STX2. To reduce power consumption, during the vertical blank interval, the transmitting device 100 may enter the low-power mode.

In response to entering the low-power mode during the vertical blank interval, the transmitting device 100 may power off the phase locked loop circuit 120. Before entering the high-speed mode for the purpose of transmission of the image frame FRM, the transmitting device 100 may power on the phase locked loop circuit 120.

In an embodiment, the image frame FRM may be transmitted in units of row of pixels. In the high-speed mode, the transmitting device 100 may transmit one image data of one row (e.g., image data generated by pixels of one row or corresponding to pixels of one row) as the second transmit signal STX2 and may then have a horizontal blank interval before transmitting image data of a next row as the second transmit signal STX2. To reduce power consumption, during the horizontal blank interval, the transmitting device 100 may enter the low-power mode.

In response to entering the low-power mode during the horizontal blank interval, the transmitting device 100 may power off the phase locked loop circuit 120. Before entering the high-speed mode for the purpose of transmission of image data of a next row, the transmitting device 100 may power on the phase locked loop circuit 120.

Because the control circuit 110 is implemented to include at least a part of the link layer, the control circuit 110 may know a time length of the vertical blank interval (or the horizontal blank interval). The control circuit 110 may set the first time interval and the second time interval of the low-power mode based on the time length of the vertical blank interval (or the horizontal blank interval), and a time necessary for the phase locked loop circuit 120 to lock a phase of the clock signal CLK.

For example, the control circuit 110 may set a length of the second time interval of the low-power mode so as to be the same as or longer than a time necessary for the phase locked loop circuit 120 to lock a phase of the clock signal CLK. When the length of the second time interval is set, the control circuit 110 may set the remaining time interval of the low-power mode to the first time interval.

In an embodiment, when the signal generation device 200 is a processor and the external device to which the transmitting device 100 transmits the second transmit signal STX2 is a display, the control circuit 110 may generate (or receive) a tearing effect (TE) signal. The tearing effect signal may be activated before the vertical blank interval ends. The control circuit 110 may be implemented to start the second time interval in response to the tearing effect signal.

Figure 3:
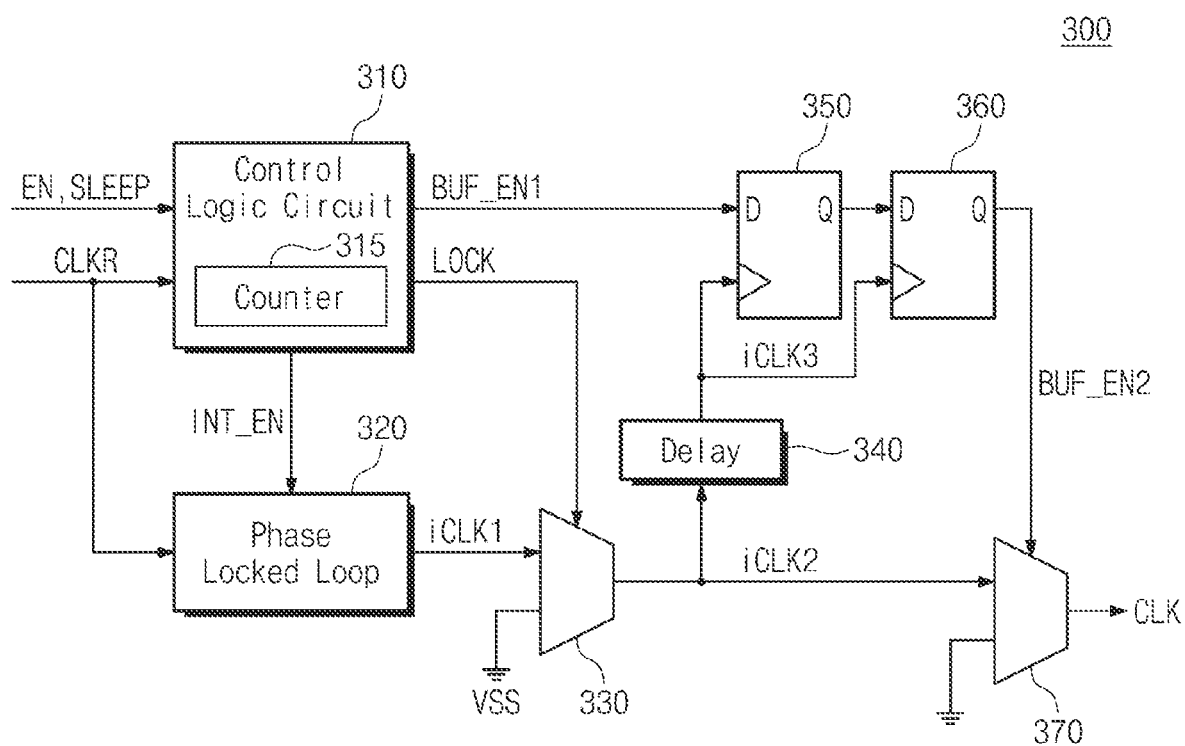
FIG. 3 illustrates a phase locked loop circuit according to embodiments of the inventive concepts.

FIG. 3 illustrates a phase locked loop circuit 300 according to embodiments of the inventive concepts. Referring to FIGS. 1 and 3, the phase locked loop circuit 300 may correspond to the phase locked loop circuit 120 of FIG. 1.

The phase locked loop circuit 300 may include control logic circuit 310, a phase locked loop 320, a first multiplexer 330, a delay 340, a first flip-flop 350, a second flip-flop 360, and a second multiplexer 370.

The control logic circuit 310 may receive the enable signal EN, the sleep signal SLEEP, and the reference clock signal CLKR from the control circuit 110. The control logic circuit 310 may operate in synchronization with the reference clock signal CLKR. The control logic circuit 310 may generate an internal enable signal INT_EN in response to the enable signal EN and the sleep signal SLEEP.

In response to the enable signal EN in an inactive state, the control logic circuit 310 may deactivate the internal enable signal INT_EN. In response to that the enable signal EN in an active state and the sleep signal SLEEP in an inactive state, the control logic circuit 310 may activate the internal enable signal INT_EN. In response to the sleep signal SLEEP in the active state, the control logic circuit 310 may deactivate the internal enable signal INT_EN.

The control logic circuit 310 may include a counter 315. The control logic circuit 310 may start counting using the counter 315 in response to activating the internal enable signal INT_EN. In response to a count value of the counter 315 reaching a specific value, the control logic circuit 310 may activate a lock signal LOCK.

The activation of the lock signal LOCK may indicate that the phase locked loop 320 locks a phase of a first internal clock signal iCLK1. In an embodiment, the specific value that is compared with the count value of the counter 315 may be defined based on a time necessary for the phase locked loop 320 to lock a phase of the first internal clock signal iCLK1.

In response to the activating of the lock signal LOCK, the control logic circuit 310 may activate a first buffer enable signal BUF_EN1. The first buffer enable signal BUF_EN1 may allow the phase locked loop circuit 300 to start outputting the clock signal CLK.

The phase locked loop 320 may receive the reference clock signal CLKR from the control circuit 110 and may receive the internal enable signal INT_EN from the control logic circuit 310. In response to the internal enable signal INT_EN being activated, the phase locked loop 320 may be turned on and may generate the first internal clock signal iCLK1 from the reference clock signal CLKR. In response to that the internal enable signal INT_EN being deactivated, the phase locked loop 320 may be powered off and may not consume a power.

The first multiplexer 330 may receive the first internal clock signal iCLK1 output from the phase locked loop 320 and may receive a ground voltage VSS from a ground node. In response to that the lock signal LOCK being deactivated, the first multiplexer 330 may output the ground voltage VSS. In response to the lock signal LOCK being activated, the first multiplexer 330 may output the first internal clock signal iCLK1. In an embodiment, an output of the first multiplexer 330 may be a second internal clock signal iCLK2.

The delay 340 may receive the second internal clock signal iCLK2 output from the first multiplexer 330. The delay 340 may delay the second internal clock signal iCLK2 so as to be output as a third internal clock signal iCLK3. The third internal clock signal iCLK3 may be transferred to a clock input of the first flip-flop 350 and a clock input of the second flip-flop 360.

The first flip-flop 350 may receive the first buffer enable signal BUF_EN1 from the control logic circuit 310. The first flip-flop 350 may transfer the first buffer enable signal BUF_EN1 to the second flip-flop 360 in synchronization with the third internal clock signal iCLK3. In synchronization with the third internal clock signal iCLK3, the second flip-flop 360 may transfer an output of the first flip-flop 350 to the second multiplexer 370 as a second buffer enable signal BUF_EN2.

The delay 340, the first flip-flop 350, and the second flip-flop 360 may delay the first buffer enable signal BUF_EN1 so as to be transferred to the second multiplexer 370 as the second buffer enable signal BUF_EN2. Accordingly, the delay 340, the first flip-flop 350, and the second flip-flop 360 may be characterized as a delay circuit group that delays the first buffer enable signal BUF_EN1. The delay circuit group may adjust an activation timing of the second buffer enable signal BUF_EN2 such that a glitch does not occur at the clock signal CLK.

The second multiplexer 370 may receive the second internal clock signal iCLK2 output from the first multiplexer 330 and may receive the ground voltage VSS from the ground node. In response to the second buffer enable signal BUF_EN2 being deactivated, the second multiplexer 370 may output the ground voltage VSS. In response to the second buffer enable signal BUF_EN2 being activated, the second multiplexer 370 may output the second internal clock signal iCLK2. In an embodiment, an output of the second multiplexer 370 may be the clock signal CLK.

Figure 4:
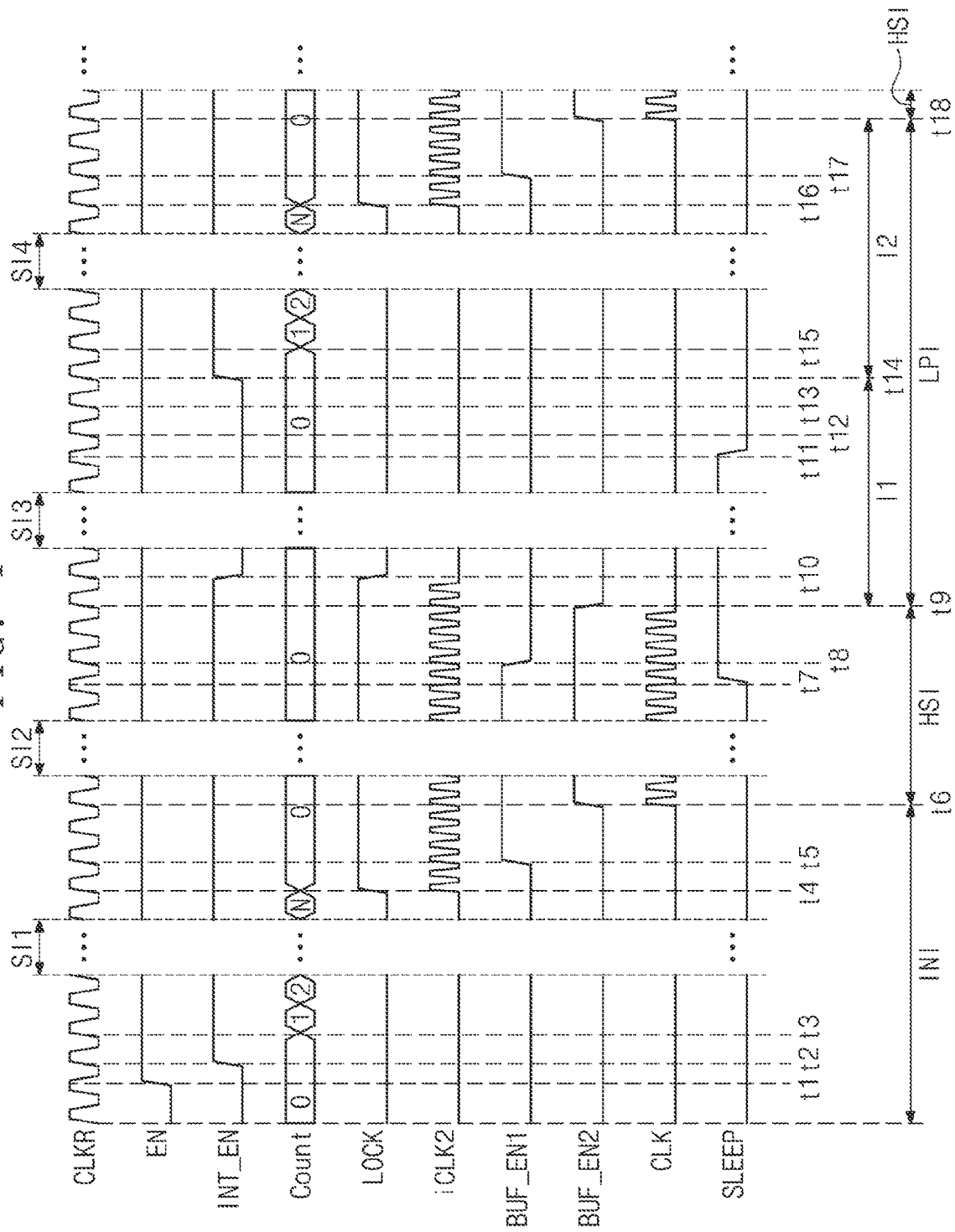
FIG. 4 illustrates examples of waveforms of signals of a phase locked loop circuit according to embodiments of the inventive concepts.

FIG. 4 illustrates examples of waveforms of signals of the phase locked loop circuit 300 according to embodiments of the inventive concepts. Referring to FIGS. 1, 3, and 4, the reference clock signal CLKR may consistently toggle between a high level and a low level. The phase locked loop circuit 300 may operate in synchronization with the reference clock signal CLKR.

When the electronic device 10 is powered on, at a first time t1, the control circuit 110 may activate the enable signal EN. For example, the enable signal EN may be an asynchronous signal that is not synchronized with the reference clock signal CLKR.

After the enable signal EN is activated, at a rising edge (e.g., the first rising edge) of the reference clock signal CLKR, that is at a second time t2, the control logic circuit 310 may activate the internal enable signal INT_EN. In response to the activation of the internal enable signal INT_EN, the phase locked loop 320 may start locking a phase of the first internal clock signal iCLK1. In response to the activation of the internal enable signal INT_EN, at a third time t3 the control logic circuit 310 may start a counting operation of the counter 315.

During a first skip interval SI1, levels of signals may be maintained except that a count of the counter 315 increases and the reference clock signal CLKR toggles. In response to the count of the counter 315 reaching a specific value (e.g., "N" being a positive integer), at a fourth time t4 the control logic circuit 310 may activate the lock signal LOCK. The control logic circuit 310 may initialize a count value of the counter 315.

At least from the fourth time t4, the phase locked loop 320 may generate the first internal clock signal iCLK1, the phase of which is locked. Before the lock signal LOCK is activated, the first multiplexer 330 may output the ground voltage VSS as the second internal clock signal iCLK2. In response to the lock signal LOCK being activated, the first multiplexer 330 may output the first internal clock signal iCLK1 as the second internal clock signal iCLK2. That is, the second internal clock signal iCLK2 may toggle between the high level and the low level from the fourth time t4.

In response to activating the lock signal LOCK, at a fifth time t5 the control logic circuit 310 may activate the first buffer enable signal BUF_EN1. After a delay time of the delay circuit group from the activation of the first buffer enable signal BUF_EN1, the second buffer enable signal BUF_EN2 may be activated at a sixth time t6. In response to the activation of the second buffer enable signal BUF_EN2, the phase locked loop circuit 300 may output the clock signal CLK toggling between the high level and the low level.

An operation between the first time t1 and the sixth time t6 may correspond to an initialization interval INI of the phase locked loop circuit 300. The transmitting device 100 may enter a high-speed interval HSI, in which an operation is performed in the high-speed mode, from the sixth time t6.

During a second skip interval SI2, the transmitting device 100 may maintain the high-speed interval HSI in which an operation is performed in the high-speed mode. At a seventh time t7, the control circuit 110 may activate the sleep signal SLEEP. The sleep signal SLEEP may be an asynchronous signal that is not synchronized with the reference clock signal CLKR.

After the sleep signal SLEEP is activated, at a rising edge (e.g., the first rising edge) of the reference clock signal CLKR, that is at an eighth time t8, the control logic circuit 310 may deactivate the first buffer enable signal BUF_EN1. After the delay time of the delay circuit group from the deactivation of the first buffer enable signal BUF_EN1, the second buffer enable signal BUF_EN2 may be deactivated at a ninth time t9. In response to the deactivation of the second buffer enable signal BUF_EN2, the phase locked loop circuit 300 may output a ground level as the clock signal CLK.

In response to the deactivation of the first buffer enable signal BUF_EN1 at the ninth time t9, the control logic circuit 310 may deactivate the lock signal LOCK and the internal enable signal INT_EN at a tenth time t10. In response to the deactivation of the lock signal LOCK, the second internal clock signal iCLK2 may stop toggling. For example, the first multiplexer 330 may output the ground voltage VSS in response to the deactivation of the lock signal LOCK.

FIG. 4 shows a time at which the second buffer enable signal BUF_EN2 and the ninth time t9 are the same, but this is only an example. In other embodiments the time at which the second buffer enable signal BUF_EN2 is deactivated and the ninth time t9 may be different from each other depending on a frequency of the first internal clock signal iCLK1 generated by the phase locked loop 320 and a delay amount of the delay circuit group.

An operation between the sixth time t6 and the ninth time t9 may correspond to the high-speed interval HSI of the phase locked loop circuit 300. The transmitting device 100 may enter a low-power interval LPI, in which an operation is performed in the low-power mode, from the ninth time t9.

During a third skip interval SI3, the transmitting device 100 may maintain the low-power interval LPI in which an operation is performed in the low-power mode. At an eleventh time t11, the control circuit 110 may deactivate the sleep signal SLEEP. The sleep signal SLEEP may be an asynchronous signal that is not synchronized with the reference clock signal CLKR.

After a given number of clock cycles of the reference clock signal CLKR, for example after clock cycles of a twelfth time t12 and a thirteenth time t13 elapses from the deactivation of the sleep signal SLEEP at the eleventh time t11, at a fourteenth time t14 the control logic circuit 310 may activate the internal enable signal INT_EN. Afterwards, operations at a fifteenth time t15, a sixteenth time t16, a seventeenth time t17, and an eighteenth time t18 may respectively be the same as operations at the third time t3, the fourth time t4, the fifth time t5, and the sixth time t6. A fourth skip interval SI4 may be the same as the first skip interval SI1.

An operation between the ninth time t9 and the eighteenth time t18 may correspond to the low-power interval LPI of the phase locked loop circuit 300. The transmitting device 100 may enter the high-speed interval HSI, in which an operation is performed in the high-speed mode, beginning at the eighteenth time t18.

Figure 5:
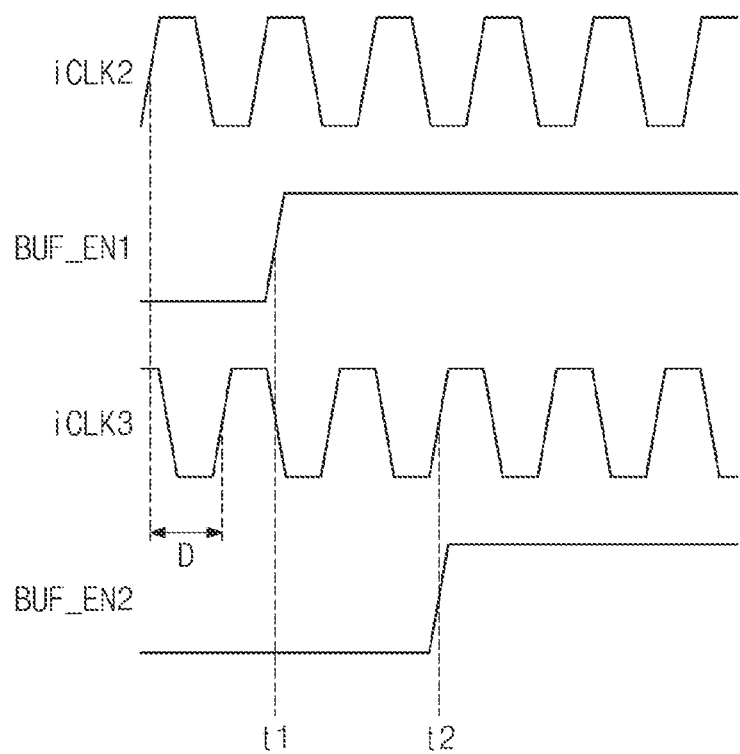
FIG. 5 illustrates timings of a second internal clock signal, a first buffer enable signal, a third internal clock signal, and a second buffer enable signal in greater detail.

FIG. 5 illustrates timings of the second internal clock signal iCLK2, the first buffer enable signal BUF_EN1, the third internal clock signal iCLK3, and the second buffer enable signal BUF_EN2 in greater detail. Referring to FIGS. 1, 3, and 5, the delay 340 may delay the second internal clock signal iCLK2 as much as a delay amount "D" to output the third internal clock signal iCLK3.

The first buffer enable signal BUF_EN1 may be output as the second buffer enable signal BUF_EN2 in synchronization with the third internal clock signal iCLK3. For example, because the first buffer enable signal BUF_EN1 is transferred through the first flip-flop 350 and the second flip-flop 360 and provided as the second buffer enable signal BUF_EN2, the first buffer enable signal BUF_EN1 may be provided as the second buffer enable signal BUF_EN2 at the second rising edge of the third internal clock signal iCLK3 after the activation of the first buffer enable signal BUF_EN1.

When the first buffer enable signal BUF_EN1 is activated at a first time t1, the second buffer enable signal BUF_EN2 may be activated at a second time t2. In the case where the second internal clock signal iCLK2 is at the high level when the second buffer enable signal BUF_EN2 is activated, a glitch may occur at the clock signal CLK. Accordingly, the delay 340 may have the delay amount "D" that is set such that the second internal clock signal iCLK2 has a low-to-high transition after the second buffer enable signal BUF_EN2 is activated, for example, such that the second buffer enable signal BUF_EN2 is activated while the second internal clock signal iCLK2 is at the low level. Accordingly, a glitch may be prevented from occurring at the clock signal CLK.

For example, the delay amount "D" may be a total of delay amount from when the first buffer enable signal BUF_EN1 is activated to when the second buffer enable signal BUF_EN2 is activated. The delay amount "D" may include a delay amount of the delay 340, a delay amount of the first flip-flop 350, and a delay amount of the second flip-flop 360. The delay amount "D" may correspond to a time greater than a width of the high level (e.g., a duty) of the second internal clock signal iCLK2 and a time smaller than a period of the second internal clock signal iCLK2.

Because the delay amount "D" corresponds to the time greater than the width of the high level of the second internal clock signal iCLK2, the second buffer enable signal BUF_EN2 may be activated after the second internal clock signal iCLK2 transitions to the low level. Because the delay amount "D" corresponds to the time smaller than the period of the second internal clock signal iCLK2, the second buffer enable signal BUF_EN2 may be activated before the second internal clock signal iCLK2 transitions to the high level. Accordingly, the second buffer enable signal BUF_EN2 may be activated during the low level of the second internal clock signal iCLK2.

Figure 6:
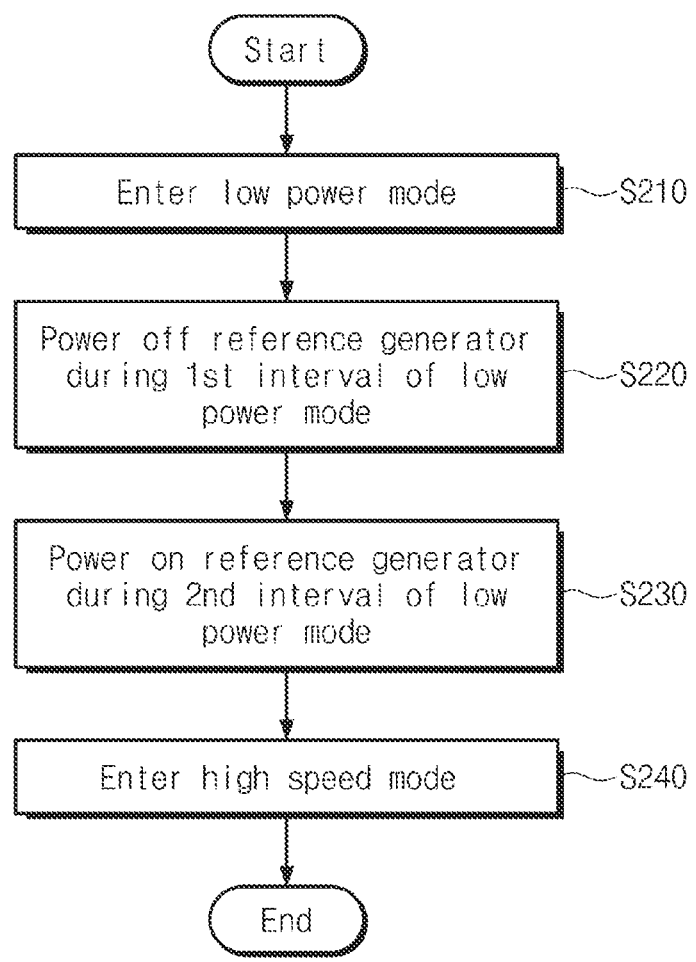
FIG. 6 illustrates a flow chart explanatory of an operating method of an electronic device according to embodiments of the inventive concepts.

FIG. 6 illustrates a flow chart explanatory of an operating method of the electronic device 10 according to embodiments of the inventive concepts. Referring to FIGS. 1 and 6, in operation S210, the electronic device 10 enters the low-power mode. In operation S220, in response to entering the low-power mode, the control circuit 110 of the transmitting device 100 in the electronic device 10 powers off the reference generator 135 of the physical circuit 130 during a first time interval of the low-power mode. Accordingly, the power consumption of the electronic device 10 may decrease.

In operation S230, in response to the first time interval of the low-power mode elapsing, the control circuit 110 powers on the reference generator 135 during a second time period of the low-power mode. For example, during the second time interval, the reference generator 135 may adjust a level of a reference voltage to a target level.

In operation S240, in response to the second time interval of the low-power mode elapsing, the electronic device 10 enters the high-speed mode. In the high-speed mode, the electronic device 10 may transmit the second transmit signal STX2 to the external device by using the reference voltage.

As described above, the electronic device 10 may reduce power consumption by turning off the reference generator 135 in the low-power mode. Also, the electronic device 10 may power on the reference generator 135 before the second time interval of the low-power mode elapses so that the reference generator 135 may adjust a level of the reference voltage to a target level before entering the high-speed mode. Accordingly, an operation in the high-speed mode is not affected by the reference generator 135 being powered off in the low-power mode.

In an embodiment, the control circuit 110 may be implemented to include at least a part of the link layer. The signal generation device 200 may be an image sensor configured to generate the image frame FRM, or a processor configured to transmit the image frame FRM, for the purpose of displaying the image frame FRM.

In the high-speed mode, the transmitting device 100 may transmit one image frame FRM as the second transmit signal STX2, and may then have a vertical blank interval before transmitting a next image frame FRM as the second transmit signal STX2. To reduce power consumption, during the vertical blank interval, the transmitting device 100 may enter the low-power mode.

In response to entering the low-power mode during the vertical blank interval, the transmitting device 100 may power off the reference generator 135. Before entering the high-speed mode for the purpose of transmission of the image frame FRM, the transmitting device 100 may power on the reference generator 135.

Alternatively, in the high-speed mode, the transmitting device 100 may transmit image data corresponding to one row of pixels as the second transmit signal STX2 and may then have a horizontal blank interval before transmitting image data of a next row as the second transmit signal STX2. To reduce power consumption, during the horizontal blank interval, the transmitting device 100 may enter the low-power mode.

In response to entering the low-power mode during the horizontal blank interval, the transmitting device 100 may power off the reference generator 135. Before entering the high-speed mode for the purpose of transmission of image data of a next row, the transmitting device 100 may power on the reference generator 135.

Because the control circuit 110 is implemented to include at least a part of the link layer, the control circuit 110 may know a time length of the blank interval (e.g., the vertical blank interval or the horizontal blank interval). The control circuit 110 may set the first time interval and the second time interval of the low-power mode based on a time length of the blank interval and a time necessary for the reference generator 135 to adjust a level of the reference voltage to a target level.

For example, the control circuit 110 may set a length of the second time interval of the low-power mode so as to be the same as or longer than a time necessary for the reference generator 135 to adjust a level of the reference voltage to the target level. When the length of the second time interval is set, the control circuit 110 may set the remaining time interval of the low-power mode to the first time interval.

In an embodiment, the control circuit 110 may power off both the phase locked loop circuit 120 and the reference generator 135 in the first time interval of the low-power mode. The control circuit 110 may power on both the phase locked loop circuit 120 and the reference generator 135 in the second time interval of the low-power mode.

As in the description given with reference to FIG. 4, upon initialization, the transmitting device 100 may power on the reference generator 135. Afterwards, in response to the transmitting device 100 entering the low-power mode, operation S210 to operation S230 may be performed.

In an embodiment, the transmitting device 100 may be set to selectively power on and power off the phase locked loop circuit 120 and the reference generator 135 in the low-power mode.

Figure 7A:
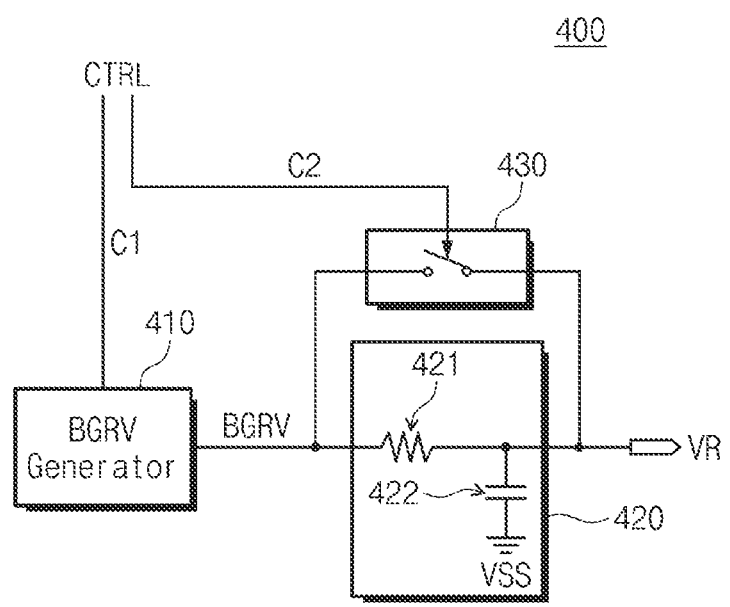
FIG. 7A illustrates a reference generator according to embodiments of the inventive concepts.

FIG. 7A illustrates a reference generator 400 according to embodiments of the inventive concepts. Referring to FIGS. 1 and 7A, the reference generator 400 may include a bandgap reference voltage (BGRV) generator 410, a filter 420, and a bypass switch 430.

The bandgap reference voltage generator 410 may operate in response to a first control signal C1. The first control signal C1 may be included in the control signal CTRL. In response to the first control signal C1 being activated, the bandgap reference voltage generator 410 may be powered on and may output a bandgap reference voltage BGRV. In response to that the first control signal C1 being deactivated, the bandgap reference voltage generator 410 may be powered off, and thus power consumption may decrease.

The filter 420 may receive the bandgap reference voltage BGRV output from the bandgap reference voltage generator 410. The filter 420 may perform low pass filtering on the bandgap reference voltage BGRV to output a reference voltage VR. For example, the filter 420 may include a resistor 421 connected between an output of the bandgap reference voltage generator 410 and an output node from which the reference voltage VR is output, and a capacitor 422 connected between the output node and the ground node to which the ground voltage VSS is supplied.

The bypass switch 430 may be connected between the output of the bandgap reference voltage generator 410 and the output node. The bypass switch 430 may operate in response to a second control signal C2. The second control signal C2 may be included in the control signal CTRL.

In response to that the second control signal C2 being activated, the bypass switch 430 may electrically connect the output of the bandgap reference voltage generator 410 and the output node. That is, the bypass switch 430 may bypass the filter 420 to transfer the bandgap reference voltage BGRV as the reference voltage VR.

In response to that the second control signal C2 being deactivated, the bypass switch 430 may electrically disconnect the output of the bandgap reference voltage generator 410 from the output node. That is, the bypass switch 430 may block a bypass path such that the bandgap reference voltage BGRV is transferred through the filter 420 to be provided as the reference voltage VR.

The filter 420 may remove noise and ripple from the bandgap reference voltage BGRV so as to provide the reference voltage VR. However, the filter 420 may delay a time taken for the reference voltage VR to reach a target level. Accordingly, the filter 420 may hinder the bandgap reference voltage generator 410 from outputting a reference voltage having the target level during the second time interval of the low-power mode.

In the first time interval of the low-power mode, the control circuit 110 according to embodiments of the inventive concepts may deactivate the first control signal C1 to power off the bandgap reference voltage generator 410. In an embodiment, in the first time interval of the low-power mode, the control circuit 110 may activate or deactivate the second control signal C2.

In the second time interval of the low-power mode, the control circuit 110 may activate the first control signal C1 to power on the bandgap reference voltage generator 410. Also, in the second time interval of the low-power mode, the control circuit 110 may activate the second control signal C2 such that the bandgap reference voltage BGRV is transferred as the reference voltage VR by passing through the filter 420. Accordingly, a time taken for the reference voltage VR to reach a target level may be shortened.

In the high-speed mode, the control circuit 110 may maintain an active state of the first control signal C1 to maintain a power-on state of the bandgap reference voltage generator 410. In the high-speed mode, the control circuit 110 may deactivate the second control signal C2 to remove a bypass path. Accordingly, noise and ripple may be removed from the reference voltage VR reaching the target level.

FIG. 7B illustrates an example in which the control circuit 110 controls the reference generator 400. Referring to FIGS. 1, 3, 7A, and 7B, the enable signal EN may be activated at a first time t1. In response to the activation of the enable signal EN, at a second time t2 synchronized with a rising edge of the reference clock signal CLKR the control circuit 110 may activate the first control signal C1.

In response to the activation of the first control signal C1, the bandgap reference voltage generator 410 may be powered on. The bandgap reference voltage generator 410 may start generating the reference voltage VR.

At a third time t3, a counter may start a counting operation. Similar as described with reference to FIG. 3, the counter may be counter 315 included in the control logic circuit 310 of the phase locked loop circuit 300, and the counter may start counting at the time t3 in response to the activation of the enable signal EN.

Alternatively, the counter may be included in the control circuit 110. During a first skip interval SI1, levels of signals may be maintained except that a count of the counter increases and the reference clock signal CLKR toggles.

During a second skip interval SI2, levels of signals may be maintained except that the reference clock signal CLKR toggles. During a time between a fourth time t4 and a fifth time t5, the reference generator 400 may generate a valid reference voltage VR.

At the fifth time t5, the sleep signal SLEEP may be activated. In response to the activation of the sleep signal SLEEP, at a sixth time t6 synchronized with a rising edge of the reference clock signal CLKR, the control circuit 110 may deactivate the first control signal C1. In response to the deactivation of the first control signal C1, the bandgap reference voltage generator 410 may be powered off. During a third skip interval SI3, levels of signals may be maintained except that the reference clock signal CLKR toggles.

At a seventh time t7, the sleep signal SLEEP may be deactivated. In response to the deactivation of the sleep signal SLEEP, at an eighth time t8 synchronized with a rising edge of the reference clock signal CLKR, the control circuit 110 may activate the first control signal C1. Also, at the eighth time t8, the control circuit 110 may activate the second control signal C2.

In response to the activation of the second control signal C2, the bypass switch 430 may be turned on to establish a bypass path of the filter 420. The bypass switch 430 may accelerate a time taken for the reference voltage VR to reach the target level or a speed at which the reference voltage VR reaches the target level. During a fourth skip interval SI4, levels of signals may be maintained except that the reference clock signal CLKR toggles.

In response to a specific time (e.g., 10 us) elapsing from the activation of the second control signal C2, or in response to a count value of the counter reaches a specific value, at a ninth time t9 the control circuit 110 may deactivate the second control signal C2.

In response to the deactivation of the second control signal C2, the bypass switch 430 may be turned off to remove the bypass path of the filter 420. The filter 420 may be activated to suppress noise and ripple of the reference voltage VR. In an embodiment, the specific time or the count value of the counter may be defined based on a characteristic of the bandgap reference voltage generator 410.

As described above, in response to entering the blank interval in the low-power mode, the control circuit 110 may power off the reference generator 135 (i.e., 400) of the physical circuit 130. Accordingly, the power consumption of the transmitting device 100 may be reduced. In FIGS. 7A and 7B, the reference generator 400 generates the reference voltage VR. However, in other embodiments the reference generator 400 may be implemented to generate a reference current.

Figure 8:
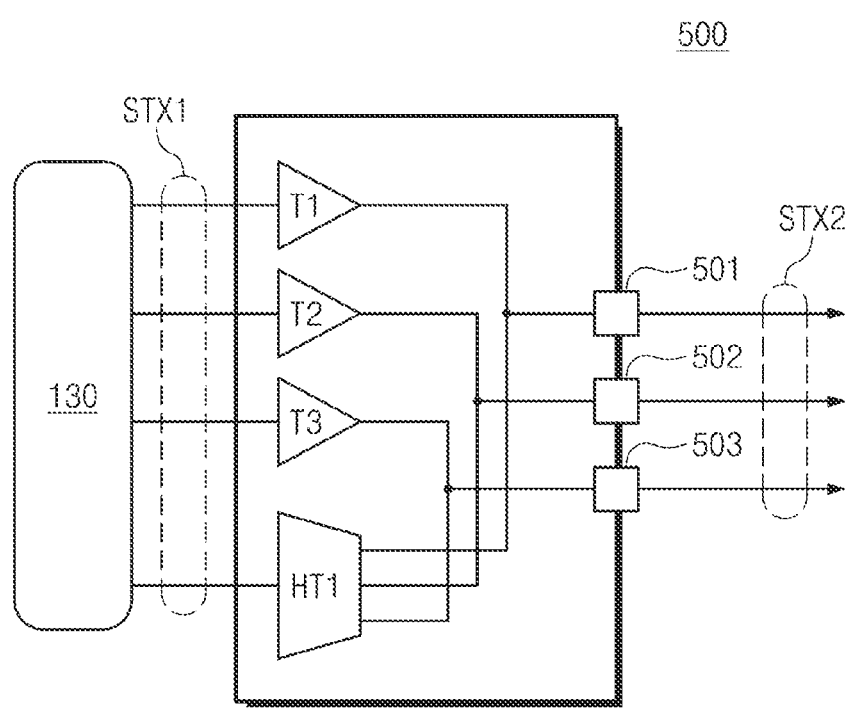
FIG. 8 illustrates a driving circuit according to a first embodiment of the inventive concepts.

FIG. 8 illustrates a driving circuit 500 according to a first embodiment of the inventive concepts. Referring to FIGS. 1 and 8, the driving circuit 500 may include a first connector 501, a second connector 502, a third connector 503, a first transmitter T1, a second transmitter T2, a third transmitter T3, and a first high-speed transmitter HT1. The first connector 501, the second connector 502, and the third connector 503 may output the second transmit signal STX2.

The first transmitter T1 may be activated in the low-power mode. In the low-power mode, the first transmitter T1 may transmit a signal transferred from the physical circuit 130 to the external device through the first connector 501. The second transmitter T2 may be activated in the low-power mode. In the low-power mode, the second transmitter T2 may transmit a signal transferred from the physical circuit 130 to the external device through the second connector 502. The third transmitter T3 may be activated in the low-power mode. In the low-power mode, the third transmitter T3 may transmit a signal transferred from the physical circuit 130 to the external device through the third connector 503.

The first high-speed transmitter HT1 may be activated in the high-speed mode. In the high-speed mode, the first high-speed transmitter HT1 may convert the first transmit signal STX1 transferred from the physical circuit 130 into signals of three phases and may transmit the signals of the three phases to the external device as the second transmit signal STX2 through the first connector 501, the second connector 502, and the third connector 503.

In an embodiment, the first high-speed transmitter HT1 may include the clock signal CLK in the second transmit signal STX2 in the form of an embedded clock before transmitting the second transmit signal STX2. That is, the first high-speed transmitter HT1 may mix the clock signal CLK and the first transmit signal STX1 together so as to be output as the second transmit signal STX2.

In an embodiment, the physical circuit 130 and the driving circuit 500 may be implemented based on the standard of C-PHY$^{SM}$ defined by the MIPI® (Mobile Industry Processor Interface).

Figure 9:
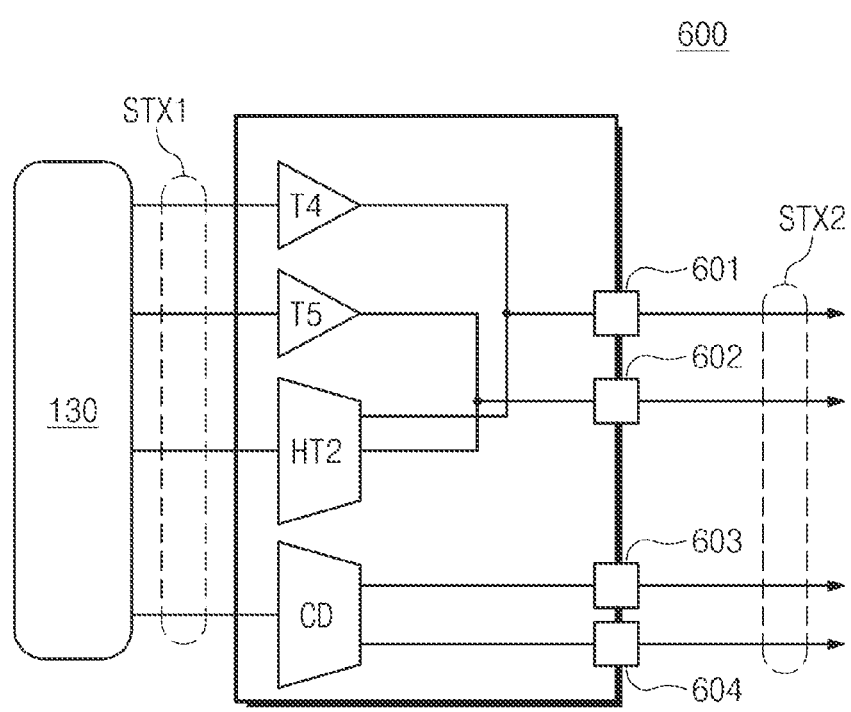
FIG. 9 illustrates a driving circuit according to a second embodiment of the inventive concepts.

FIG. 9 illustrates a driving circuit 600 according to a second embodiment of the inventive concepts. Referring to FIGS. 1 and 9, the driving circuit 600 may include a first connector 601, a second connector 602, a third connector 603, a fourth connector 604, a fourth transmitter T4, a fifth transmitter T5, a second high-speed transmitter HT2, and a clock driver CD. The first connector 601, the second connector 603, the third connector 603, and the fourth connector 604 may output the second transmit signal STX2.

The fourth transmitter T4 may be activated in the low-power mode. In the low-power mode, the fourth transmitter T4 may transmit a signal transferred from the physical circuit 130 to the external device through the first connector 601. The fifth transmitter T5 may be activated in the low-power mode. In the low-power mode, the fifth transmitter T5 may transmit a signal transferred from the physical circuit 130 to the external device through the second connector 602.

The second high-speed transmitter HT2 may be activated in the high-speed mode. In the high-speed mode, the second high-speed transmitter HT2 may convert the first transmit signal STX1 transferred from the physical circuit 130 into signals of two phases and may transmit the signals of the two phases to the external device as the second transmit signal STX2 through the first connector 601 and the second connector 602.

The clock driver CD may transmit the clock signal CLK transferred from the physical circuit 130 to the external device through the third connector 603 and the fourth connector 604. For example, the clock driver CD may convert the clock signal CLK into complementary clock signals so as to be transmitted through the third connector 603 and the fourth connector 604. In an embodiment, the physical circuit 130 and the driving circuit 600 may be implemented based on the standard of D-PHY$^{SM}$ defined by the MIPI® (Mobile Industry Processor Interface).

Figure 10A:
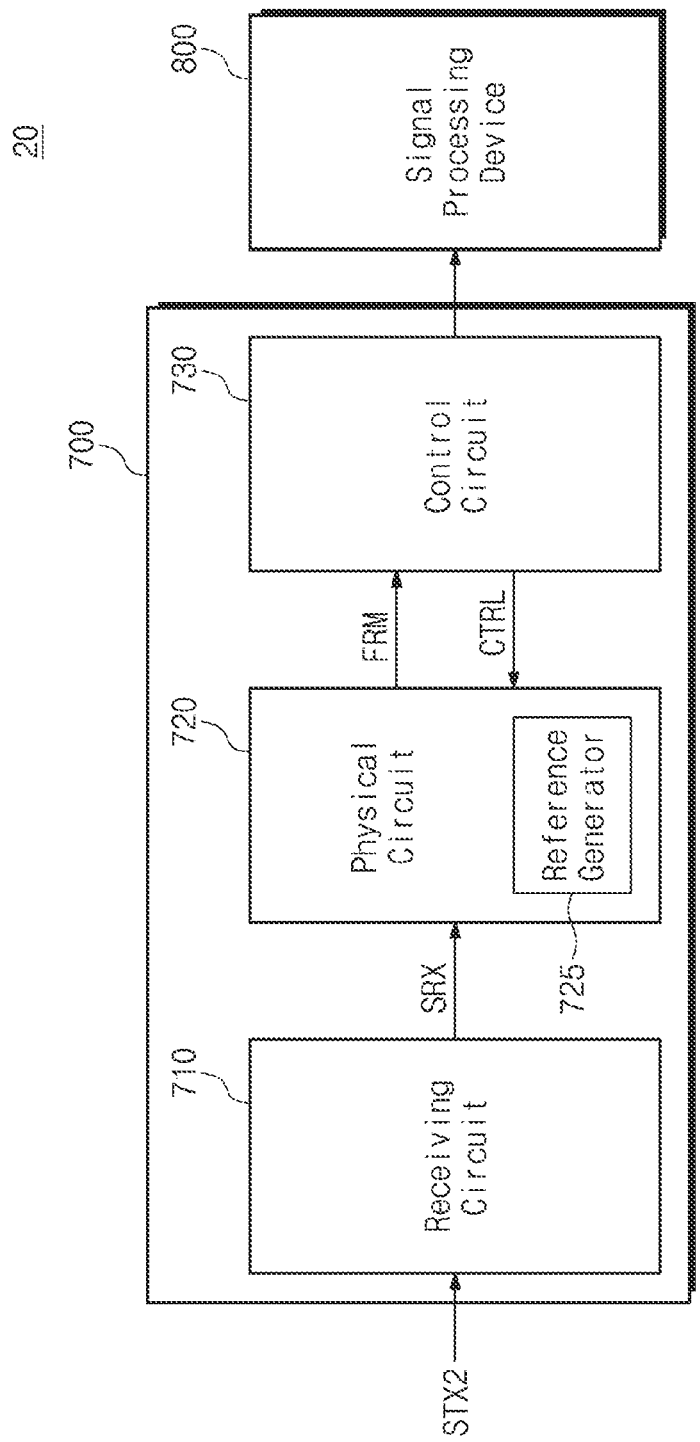
FIG. 10A illustrates an electronic device according to a second embodiment of the inventive concepts.

FIG. 10A illustrates an electronic device 20 according to a second embodiment of the inventive concepts. The electronic device 20 may include a receiving device 700 and a signal processing device 800. The receiving device 700 may receive a signal transferred from an external device based on a specific communication protocol. The signal processing device 800 may process the signal received through the receiving device 700. For example, the signal processing device 800 may include a display configured to display an image frame or a processor configured to receive an image frame.

The receiving device 700 may include a receiving circuit 710, a physical circuit 720, and a control circuit 730. The receiving circuit 710 may receive the second transmit signal STX2 so as to be output as a receive signal SRX. The receiving circuit 710 may output the receive signal SRX in compliance with a communication protocol of the receiving device 700.

The physical circuit 720 may receive a control signal CTRL from the control circuit 730. Also, the physical circuit 720 may receive the receive signal SRX from the receiving circuit 710. The physical circuit 720 may operate in response to the control signal CTRL. The physical circuit 720 may extract the image frame FRM from the receive signal SRX. The physical circuit 720 may transfer the image frame FRM to the control circuit 730.

The physical circuit 720 may include a reference generator 725. The reference generator 725 may generate a reference voltage that is used in the receiving circuit 710 and the physical circuit 720. The reference generator 725 may include the reference generator 135 (400) described with reference to FIGS. 1 and 7A. In some embodiments, the reference generator 725 may be provided outside the physical circuit 720 as a component independent of the physical circuit 720.

The control circuit 730 may receive the image frame FRM from the physical circuit 720. The control circuit 730 may transfer the image frame FRM to the signal processing device 800. Also, the control circuit 730 may control the physical circuit 720 by using the control signal CTRL.

The receiving circuit 710 and the physical circuit 720 may be implemented to constitute a physical layer. The physical layer may be implemented based on C-PHY$^{SM}$ or D-PHY$^{SM}$ defined by the MIPI®.

Figure 10B:
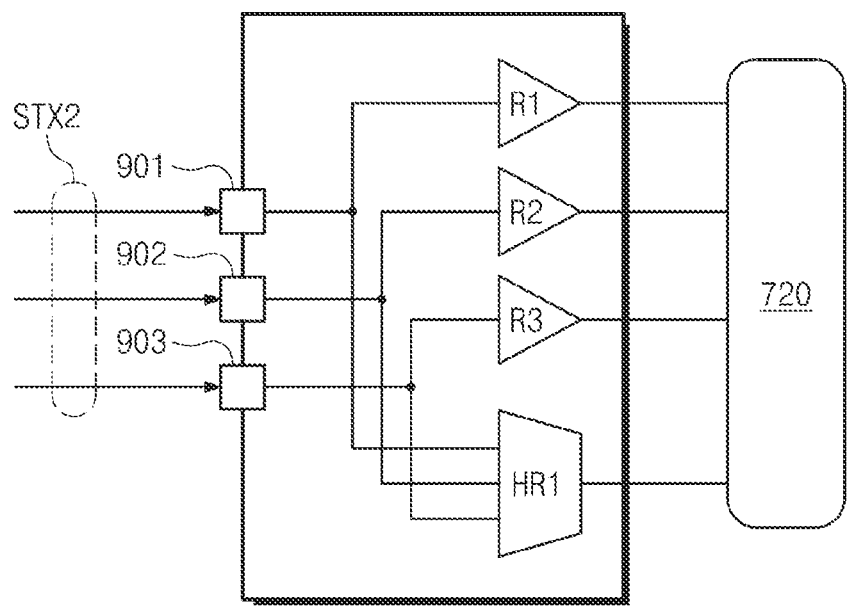
FIG. 10B illustrates a receiving circuit according to a first embodiment of the inventive concepts.

FIG. 10B illustrates a receiving circuit 900a according to a first embodiment of the inventive concepts. Referring to FIGS. 10A and 10B, the receiving circuit 900a may include a first connector 901, a second connector 902, a third connector 903, a first receiver R1, a second receiver R2, a third receiver R3, and a first high-speed receiver HR1. The first connector 901, the second connector 902, and the third connector 903 may receive the second transmit signal STX2.

The first receiver R1 may be activated in the low-power mode. In the low-power mode, the first receiver R1 may transmit a signal transferred from the first connector 901 to the physical circuit 720 as a portion of the receive signal SRX. The second receiver R2 may be activated in the low-power mode. In the low-power mode, the second receiver R2 may transmit a signal transferred from the second connector 902 to the physical circuit 720 as a portion of the receive signal SRX. The third receiver R3 may be activated in the low-power mode. In the low-power mode, the third receiver R3 may transmit a signal transferred from the third connector 903 to the physical circuit 720 as a portion of the receive signal SRX.

The first high-speed receiver HR1 may be activated in the high-speed mode. In the high-speed mode, the first high-speed receiver HR1 may transmit difference signals of signals of three phases transferred from the first connector 901, the second connector 902, and the third connector 903 to the physical circuit 720. For example, the first high-speed receiver HR1 may transfer a difference signal of a signal of a first phase and a signal of a second phase, a difference signal of the signal of the second phase and a signal of a third phase, and a difference signal of the signal of the first phase and the signal of the third phase to the physical circuit 720 as the receive signal SRX.

For example, the second transmit signal STX2 may include the embedded clock signal mixed with the signals of the three phases. The physical circuit 720 may recover (or extract) the embedded clock signal from the three difference signals. The physical circuit 720 may extract information from the three difference signals based on the recovered (or extracted) clock signal.

In an embodiment, the physical circuit 720 and the receiving circuit 900a may be implemented based on the standard of C-PHY$^{SM}$ defined by the MIPI® (Mobile Industry Processor Interface).

Figure 10C:
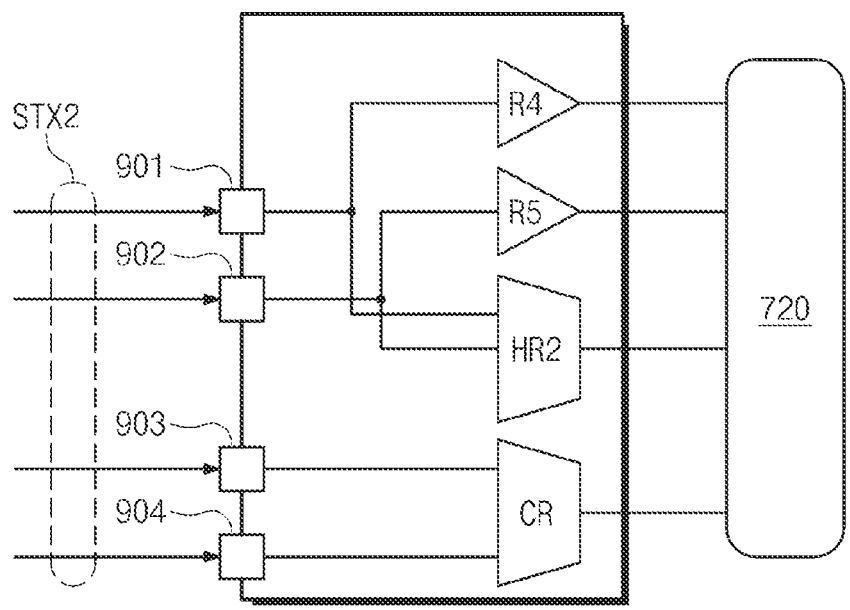
FIG. 10C illustrates a receiving circuit according to a second embodiment of the inventive concepts.

FIG. 10C illustrates a receiving circuit 900b according to a second embodiment of the inventive concepts. Referring to FIGS. 10A and 10C, the receiving circuit 900b may include a first connector 901, a second connector 902, a third connector 903, a fourth connector 904, a fourth receiver R4, a fifth receiver R5, a second high-speed receiver HR2, and a clock receiver CR. The first connector 901, the second connector 902, the third connector 903, and the fourth connector 904 may receive the second transmit signal STX2.

The fourth receiver R4 may be activated in the low-power mode. In the low-power mode, the fourth receiver R4 may transmit a signal transferred from the first connector 901 to the physical circuit 720 as a portion of the receive signal SRX. The fifth receiver R5 may be activated in the low-power mode. In the low-power mode, the fifth receiver R5 may transmit a signal transferred from the second connector 902 to the physical circuit 720 as a portion of the receive signal SRX.

The second high-speed receiver HR2 may be activated in the high-speed mode. In the high-speed mode, the second high-speed receiver HR2 may transmit a difference signal of two-phase signals transferred from the first connector 901 and the second connector 902 to the physical circuit 720 as a portion of the receive signal SRX.

The clock receiver CR may transmit the complementary clock signals transferred from the third connector 903 and the fourth connector 904 to the physical circuit 720 as a portion of the receive signal SRX. In an embodiment, the physical circuit 720 and the driving circuit 900b may be implemented based on the standard of D-PHY$^{SM}$ defined by the MIPI® (Mobile Industry Processor Interface).

Figure 11:
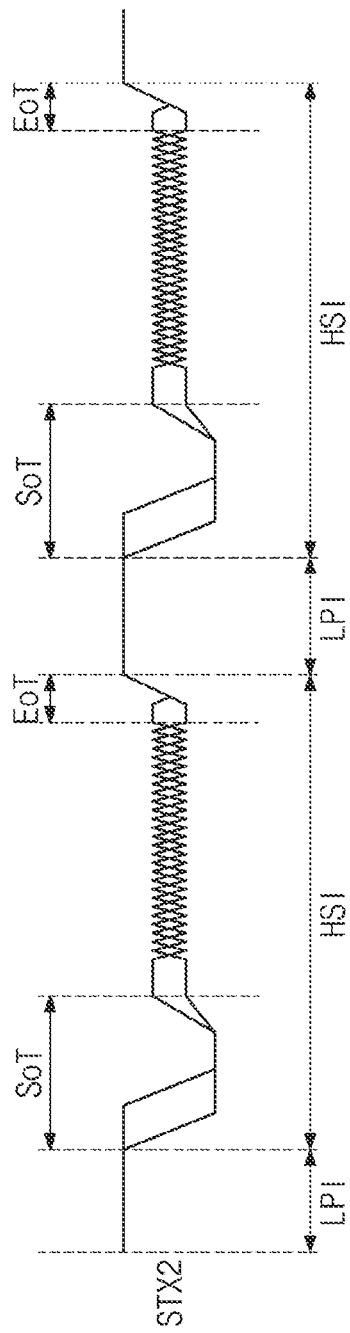
FIG. 11 illustrates an example of an interaction between the electronic device 10 according to the first embodiment and the electronic device 20 according to the first embodiment.

FIG. 11 illustrates an example of an interaction between the electronic device 10 according to the first embodiment and the electronic device 20 according to the first embodiment. Referring to FIGS. 1, 10B, and 11, an example of a waveform of the second transmit signal STX2 over time is illustrated. In an embodiment, the second transmit signal STX2 may be implemented based on C-PHY$^{SM}$ defined by the MIPI®.

In the low-power interval LPI, the electronic device 10 may maintain a level of the second transmit signal STX2 at a specific level. The specific level may depend, for example, on the standard of C-PHY$^{SM}$ defined by the MIPI®.

The high-speed interval HSI may include a transfer start interval SoT, a transfer end interval EoT, and a transmission interval that is between the transfer start interval SoT and the transfer end interval EoT and in which the image frame FRM is transmitted. In the transfer start interval SoT, the electronic device 10 may notify the electronic device 20 that the transfer of the image frame FRM starts. In the transfer end interval EoT, the electronic device 10 may notify the electronic device 20 that the transfer of the image frame FRM ends. In the transmission interval, the electronic device 10 may mix the clock signal CLK and the first transmit signal STX1 together so as to be output as the second transmit signal STX2.

In an embodiment, the electronic device 10 may transmit one image frame FRM or one row of image data in the high-speed interval HSI and may enter the low-power interval LPI in the blank interval (e.g., the vertical blank interval or the horizontal blank interval). The electronic device 10 may reduce power consumption by powering off the phase locked loop circuit 120 or the reference generator 135 in the blank interval (e.g., the vertical blank interval or the horizontal blank interval) of the transmission interval and the blank interval that are periodically repeated.

Figure 12:
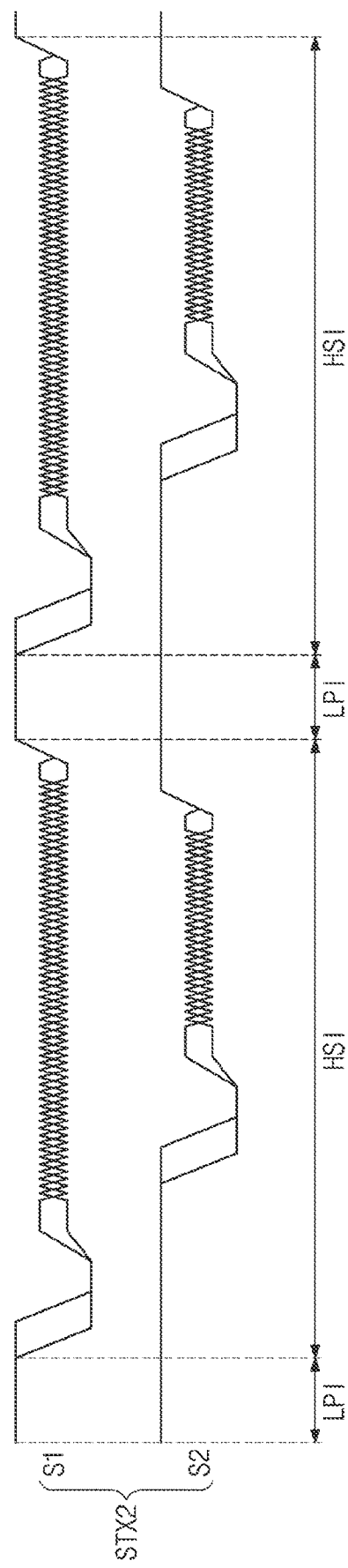
FIG. 12 illustrates an example of an interaction between the electronic device 10 according to the second embodiment and the electronic device 20 according to the second embodiment.

FIG. 12 illustrates an example of an interaction between the electronic device 10 according to the second embodiment and the electronic device 20 according to the second embodiment. Referring to FIGS. 1, 10C, and 12, an example of a waveform of the second transmit signal STX2 over time is illustrated. In an embodiment, the second transmit signal STX2 may be implemented based on D-PHY$^{SM}$ defined by the MIPI®.

The second transmit signal STX2 may include a first signal S1 and a second signal S2. The first signal S1 may be the clock signal CLK. The second signal S2 may be a two-phase signal based on the first transmit signal STX1. In the low-power interval LPI, the electronic device 10 may maintain a level of the first signal S1 at a specific level and may maintain a level of the second signal S2 at the specific level. The specific level may depend, for example, on the standard of D-PHY$^{SM}$ defined by the MIPI®.

In the high-speed interval HSI, as described with reference to FIG. 11, each of the first signal S1 and the second signal S2 may include the transfer start interval SoT, the transfer end interval EoT, and the transmission interval between the transfer start interval SoT and the transfer end interval EoT.

The first signal S1 may have the transfer start interval SoT advanced with respect to the second signal S2. After the transfer start interval SoT of the first signal S1, the first signal S1 may be used as a valid clock signal CLK. The first signal S1 may have the transfer end interval EoT delayed with respect to the second signal S2. Until the transfer end interval EoT of the first signal S1, the first signal S1 may be used as a valid clock signal CLK.

The second signal S2 may have the transfer start interval SoT delayed with respect to the first signal S1. After the transfer start interval SoT of the second signal S2, the second signal S2 may be a two-phase signal synchronized with the first signal S1. The second signal S2 may have the transfer end interval EoT advanced with respect to the first signal S1. Until the transfer end interval EoT of the second signal S2, the second signal S2 may be the two-phase signal synchronized with the first signal S1.

In the transfer start interval SoT of the first signal S1, the electronic device 10 may notify the electronic device 20 that the transfer of the image frame FRM starts. In the transfer end interval EoT of the first signal S1, the electronic device 10 may notify the electronic device 20 that the transfer of the image frame FRM ends.

In an embodiment, the electronic device 10 may transmit one image frame FRM or one row of image data in the high-speed interval HSI and may enter the low-power interval LPI in the blank interval (e.g., the vertical blank interval or the horizontal blank interval). The electronic device 10 may reduce power consumption by powering off the phase locked loop circuit 120 or the reference generator 135 in the blank interval (e.g., the vertical blank interval or the horizontal blank interval) of the transmission interval and the blank interval that are periodically repeated.

Figure 13:
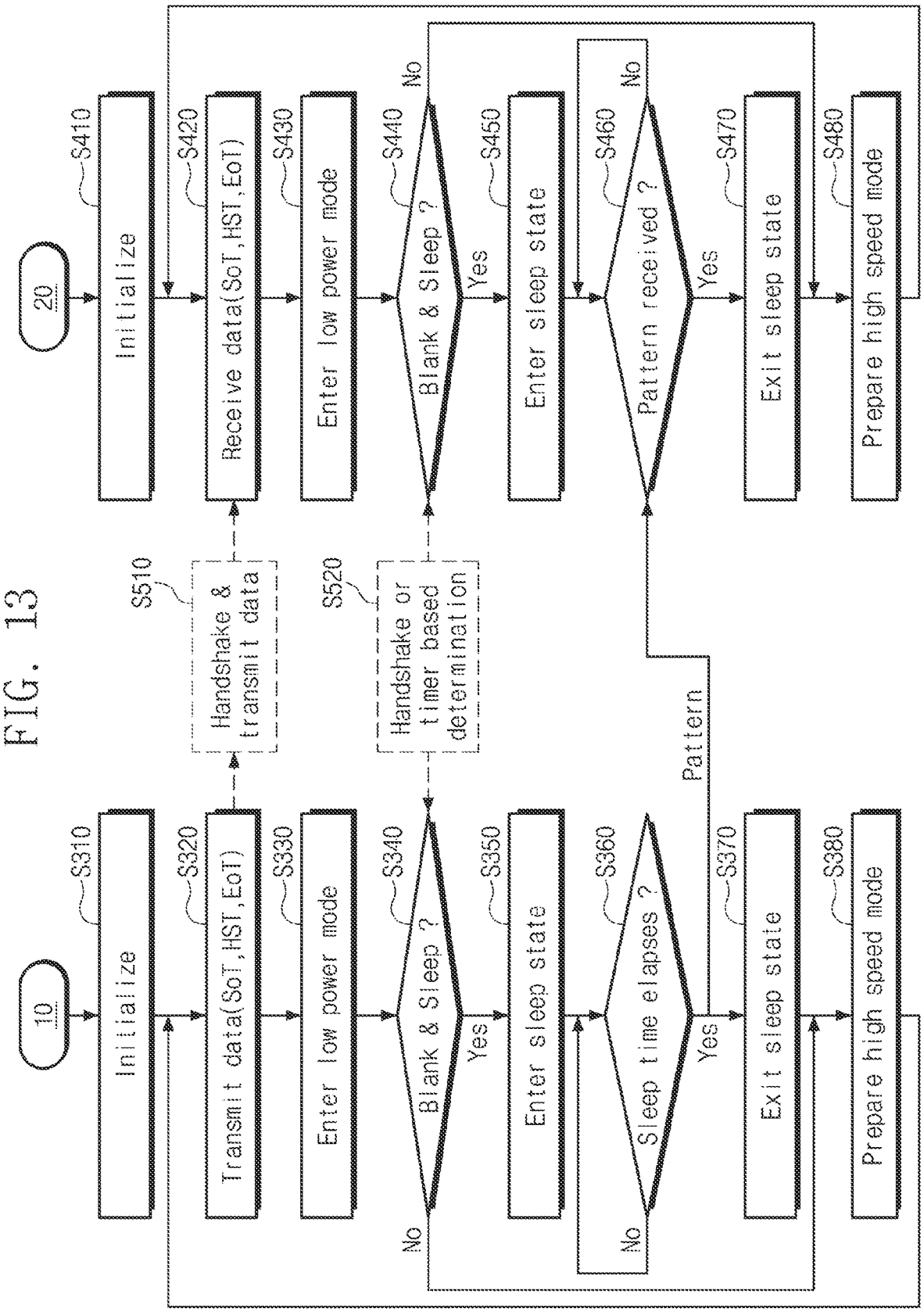
FIG. 13 illustrates a flow chart explanatory of an example in which the electronic device according to the first embodiment and the electronic device according to the second embodiment reduce power consumption through an interaction.

FIG. 13 illustrates an example in which the electronic device 10 according to the first embodiment and the electronic device 20 according to the second embodiment reduce power consumption through interaction. Referring to FIGS. 1, 10A, 10B, 10C and 13, in operation S310, the electronic device 10 performs initialization. Also, in operation S410, the electronic device 20 performs initialization.

Each of the electronic device 10 and the electronic device 20 may activate the phase locked loop circuit 120 as described with reference to FIGS. 2 to 4. The electronic device 10 and the electronic device 20 may respectively activate the voltage generators 135 and 725 as described with reference to FIGS. 6 and 10A.

In operation S320, the electronic device 10 transmits data, for example, the image frame FRM or one row of image data through the second transmit signal STX2. In operation S420, the electronic device 20 may receive the data, for example, the image frame FRM or one row of image data from the electronic device 10. In an embodiment, the electronic device 10 and the electronic device 20 may perform a handshaking operation through the transfer start interval SoT, the high-speed transfer interval HST where data are transferred, and the transfer end interval EoT, and may transmit and receive an image frame or one row of image data, as indicated by operation 510.

In response to the transfer end interval EoT, the electronic device 10 y enters the low-power mode in operation S330. Also, in response to the transfer end interval EoT, the electronic device 20 enters the low-power mode in operation S430.

In operation S340, the electronic device 10 determines whether a current interval is a blank interval, and whether a current timing is a timing to enter the sleep state. In response to determination that the current interval is not the blank interval, or in response to determination that the current interval is the blank interval but that the current timing is not the timing to enter the sleep state (e.g., in the case of a horizontal blank interval where a length of a time is relatively short) (No at S340), the electronic device 10 performs operation S380. In response to determination that the current interval is the blank interval, and in response to determination that the current timing is the timing to enter the sleep state (e.g., in the case of a vertical blank interval or a horizontal blank interval) (Yes at S340), the electronic device 10 performs operation S350.

Likewise, in operation S440, the electronic device 20 determines whether a current interval is a blank interval, and whether a current timing is a timing to enter the sleep state. In response to determination that the current interval is not the blank interval, or in response to determination that that the current interval is the blank interval but that the current timing is not the timing to enter the sleep state (e.g., in the case of a horizontal blank interval where a length of a time is relatively short) (No at S440), the electronic device 20 performs operation S480. In response to determination that the current interval is the blank interval, and in response to determination that the current timing is the timing to enter the sleep state (e.g., in the case of a vertical blank interval or a horizontal blank interval) (Yes at S440), the electronic device 20 performs operation S450.

In an embodiment, because the electronic device 20 does not include a link layer of a transmitting device, it may be difficult for the electronic device 20 to determine by itself whether a current interval is a blank interval and/or whether a current timing is a timing to enter a sleep state. To determine whether the current interval is the blank interval and/or whether the current timing is the timing to enter the sleep state, a determination may be performed based on a handshaking operation or a timer, as indicated by operation S520.

In an embodiment where the determination is performed based on handshaking, the electronic device 10 may transmit a specific pattern to the electronic device 20 in response to entering the blank interval, and in response to that it may be determined whether the current timing is the timing to enter the sleep state. For example, the electronic device 10 may transmit the specific pattern to the electronic device 20 by using at least a part of the first to fifth transmitters T1 to T5 activated in the low-power mode. The electronic device 20 may identify entry to the blank interval and that the current timing is the timing to enter the sleep state, in response to receiving the specific pattern through at least a part of the first to fifth receivers R1 to R5 activated in the low-power mode.

In an embodiment where the determination is performed based on the timer, the electronic device 20 may identify entry to the blank interval and that the current timing is the timing to enter the sleep state, in response to a specific time elapsing after the electronic device 10 enters the low-power mode.

In response to determination that the current interval is the blank interval and in response to determination that the current timing is the timing to enter the sleep state, the electronic device 10 enters the sleep state at operation S350. In response to entering the sleep mode, the electronic device 10 may power off the phase locked loop circuit 120 or the reference generator 135. Also, in response to determination that the current interval is the blank interval and in response to determination that the current timing is the timing to enter the sleep state, the electronic device 20 may enter the sleep state in operation S450. In the sleep state, the electronic device 20 may power off the reference generator 725.

In operation S360, the electronic device 10 determines whether a sleep time elapses. The sleep time may be defined by a time length of the blank interval of the electronic device 10 and a time corresponding to a specific value counted by the counter 315. For example, the sleep time may be set to be longer than the time corresponding to the specific value counted by the counter 315. The sleep time may be set to be shorter than the time length of the blank interval of the electronic device 10.

The sleep time may correspond to a time that is obtained by subtracting the time corresponding to a specific value counted by the counter 315 from the time length of the blank interval of the electronic device 10. The sleep time may be set such that the electronic device 10 may normally support the high-speed mode after the electronic device 10 powers on the phase locked loop circuit 120 or the reference generator 135. The sleep time may be defined by a characteristic and a communication protocol of the electronic device 10.

For example, in response to reaching the second time interval of the low-power mode, the control circuit 110 may determine that the sleep time elapses. When the sleep time does not elapse, the electronic device 10 may maintain the sleep state, with the phase locked loop circuit 120 or the reference generator 135 powered off. When the sleep time elapses, the electronic device 10 may transmit the specific pattern to the electronic device 20 and may then enter operation S370.

In operation S460, the electronic device 20 determines whether the specific pattern is received from the electronic device 10. For example, the electronic device 20 may determine whether the specific pattern is received from at least a part of the transmitters T1 to T5 of the electronic device 10 activated in the low-power mode, by using at least a part of the receivers R1 to R5 activated in the low-power mode.

When the specific pattern is not received (No at S460), that is until the pattern is received, the electronic device 20 maintains the sleep state, with the reference generator 725 powered off. When the specific pattern is received (Yes in S460), the electronic device 20 enters operation S470.

In operation S370, the electronic device 10 exits the sleep state. The electronic device 10 may power on the phase locked loop circuit 120 or the reference generator 135. Likewise, in operation S470, the electronic device 20 exits the sleep state. The electronic device 20 may power on the reference generator 725.

Afterwards, in operation S380, the electronic device 10 prepares the high-speed mode. Likewise, in operation S480, the electronic device 20 prepares the high-speed mode. Afterwards, the electronic device 10 enters the high-speed mode and performs data transmission in operation S320. Also, the electronic device 20 enters the high-speed mode and performs data reception in operation S420.

As described with reference to FIG. 13, the electronic device 20 may reduce power consumption under control of the electronic device 10 or by determining a state of the electronic device 10 based on a timer. Accordingly, power consumption of an electronic device including the electronic device 10 and the electronic device 20 may be reduced.

FIG. 14 illustrates an electronic device 1000 according to embodiments of the inventive concepts. Referring to FIG.

14, the electronic device 1000 may include a main processor 1100, a touch panel 1200, a touch driver integrated circuit (TDI) 1202, a display panel 1300, a display driver integrated circuit (DDI) 1302, a system memory 1400, a storage device 1500, an audio processor 1600, a communication block 1700, an image processor 1800, and a user interface 1900. In an embodiment, the electronic device 1000 may be one of various electronic devices such as for example a personal computer, a laptop computer, a server, a workstation, a portable communication terminal, a personal digital assistant (PDA), a portable media player (PMP), a digital camera, a smartphone, a tablet computer, and a wearable device, or the like.

The main processor 1100 may control overall operations of the electronic device 1000. The main processor 1100 may control/manage operations of the components of the electronic device 1000. The main processor 1100 may process various operations for the purpose of operating the electronic device 1000. The touch panel 1200 may be configured to sense a touch input from a user under control of the touch driver integrated circuit 1202. The display panel 1300 may be configured to display image information under control of the display driver integrated circuit 1302.

The system memory 1400 may store data that are used in an operation of the electronic device 1000. For example, the system memory 1400 may include for example volatile memory such as static random access memory (SRAM), dynamic RAM (DRAM), or synchronous DRAM (SDRAM), and/or nonvolatile memory such as phase-change RAM (PRAM), magneto-resistive RAM (MRAM), resistive RAM (ReRAM), or ferroelectric RAM (FRAM).

The storage device 1500 may store data regardless of power supply. For example, the storage device 1500 may include at least one of various nonvolatile memories such as for example flash memory, PRAM, MRAM, ReRAM, and FRAM. For example, the storage device 1500 may include an embedded memory of the electronic device 1000 and/or a removable memory.

The audio processor 1600 may process an audio signal by using an audio signal processor 1610. The audio processor 1600 may receive an audio input through a microphone 1620 or may provide an audio output through a speaker 1630. The communication block 1700 may exchange signals with an external device/system through an antenna 1710. A transceiver 1720 and a modulator/demodulator (MODEM) 1730 of the communication block 1700 may process signals exchanged with the external device/system, based on at least one of various wireless communication protocols: long term evolution (LTE™), worldwide interoperability for microwave access (WiMax), global system for mobile communication (GSM), code division multiple access (CDMA), Bluetooth, near field communication (NFC), wireless fidelity (Wi-Fi), and radio frequency identification (RFID).

The image processor 1800 may receive light through lens 1810. An image device 1820 and an image signal processor (ISP) 1830 included in the image processor 1800 may generate image information about an external object, based on a received light. The user interface 1900 may include an interface capable of exchanging information with a user, and may be an interface type other than the touch panel 1200, the display panel 1300, the audio processor 1600, and the image processor 1800. The user interface 1900 may include for example a keyboard, a mouse, a printer, a projector, various sensors, a human body communication device, etc.

The electronic device 1000 may further include a power management IC (PMIC) 1010, a battery 1020, and a power connector 1030. The power management IC 1010 may generate an internal power from a power supplied from the battery 1020 or a power supplied from the power connector 1030, and may provide the internal power to the main processor 1100, the touch panel 1200, the touch driver integrated circuit (TDI) 1202, the display panel 1300, the display driver integrated circuit (DDI) 1302, the system memory 1400, the storage device 1500, the audio processor 1600, the communication block 1700, the image processor 1800, and the user interface 1900.

In an embodiment, the image processor 1800 may include the electronic device 10, and the main processor 1100 may include the electronic device 20. Alternatively, the main processor 1100 may include the electronic device 10, and the display driver integrated circuit 1302 may include the electronic device 20.

In the above embodiments, components according to the present disclosure are described by using the terms "first", "second", "third", and the like. However, the terms "first", "second", "third", and the like may be used to distinguish components from each other and do not limit the present disclosure. For example, the terms "first", "second", "third", and the like do not involve an order or a numerical meaning of any form.

As is traditional in the field of the inventive concepts, the embodiments have or may have been described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, application specific ICs (ASIC), field programmable gate arrays (FPGA), complex programmable logic devices (CPLD), hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts. Also, the blocks may include circuits implemented with semiconductor elements in an integrated circuit, or circuits enrolled as an intellectual property (IP).

According to the inventive concepts, an electronic device that transmits an image frame may power off at least one component including a phase locked loop or a reference voltage generator, in a low-power mode of a blank interval that periodically occurs. Accordingly, an electronic device transmitting a signal with reduced power consumption and an operating method of the electronic device are provided.

While the inventive concepts have been described with reference to embodiments thereof, it should be apparent to those of ordinary skill in the art that various changes and modifications may be made thereto without departing from the spirit and scope of the inventive concepts as set forth in the following claims.

What is claimed is:

1. An electronic device comprising:
a control circuit configured to receive a first signal from an external device and to output a second signal and an internal enable signal based on the first signal;
a phase locked loop circuit configured to receive the internal enable signal and output a first clock signal, the phase locked loop circuit comprising:
a phase locked loop configured to output an internal clock signal from a reference clock signal in response to being powered on;
a first multiplexer configured to receive the internal clock signal and a ground voltage;
a second multiplexer configured to receive an output of the first multiplexer and the ground voltage;
a control logic circuit configured to control the first multiplexer to output the ground voltage after the phase locked loop is powered on, to output the internal clock signal in response to the phase locked loop locking a phase of the internal clock signal, and to activate a buffer enable signal in response to the phase locked loop locking the phase of the internal clock signal; and
a delay circuit group configured to delay the buffer enable signal and to transfer the delayed buffer enable signal to the second multiplexer;
a physical circuit configured to receive the first clock signal from the phase locked loop circuit and the second signal from the control circuit, and to output a third signal based on the first clock signal and the second signal; and
a driving circuit configured to output a transmit signal based on the third signal,
wherein the control circuit is operable in a high-speed mode and a low-power mode, and
wherein the control circuit is configured to power off the phase locked loop circuit in the low-power mode by deactivating the internal enable signal, and to power on the phase locked loop circuit in the high-speed mode by activating the internal enable signal.

2. The electronic device of claim 1, wherein the driving circuit comprises:
first pads;
first transmitters configured to output a first transmit signal as the transmit signal through the first pads in the low-power mode; and
a second transmitter configured to output a second transmit signal as the transmit signal through the first pads in the high-speed mode.

3. The electronic device of claim 2, wherein the driving circuit further comprises:
second pads; and
a clock driver configured to receive a second clock signal from the physical circuit and to output the second clock signal through the second pads.

4. The electronic device of claim 2, wherein the second transmitter is configured to mix the second transmit signal and an embedded clock signal together to be output as the transmit signal.

5. The electronic device of claim 1, wherein the control circuit is configured to control the physical circuit and the driving circuit to output one image frame in the high-speed mode, and
wherein the control circuit is further configured to enter the low-power mode in a blank interval.

6. The electronic device of claim 1, wherein the control circuit is configured to power off the phase locked loop circuit during a first time interval of the low-power mode, and to power on the phase locked loop circuit in a second time interval of the low-power mode.

7. The electronic device of claim 6, wherein a length of the second time interval is equal to or longer than a time necessary for the phase locked loop circuit to lock a phase of the first clock signal.

8. The electronic device of claim 1, wherein the control logic circuit comprises a counter, and
the control logic circuit is configured to start a count of the counter in response to the phase locked loop being powered on, and to identify that the phase locked loop locked the phase of the internal clock signal in response to a count value of the counter reaching a specific value.

9. The electronic device of claim 1, wherein the delay circuit group is configured to delay the buffer enable signal so that the delayed buffer enable signal is transferred to the second multiplexer between a falling edge and a rising edge of the internal clock signal.

10. The electronic device of claim 1, wherein the control logic circuit is configured to receive the reference clock signal, and to control the phase locked loop and the first multiplexer in synchronization with the reference clock signal.

11. An electronic device comprising:
a control circuit configured to receive a first signal from an external device and to output a second signal and an internal enable signal based on the first signal;
a phase locked loop circuit configured to receive the internal enable signal and output a first clock signal, the phase locked loop circuit comprising:
a phase locked loop configured to output an internal clock signal from a reference clock signal in response to being powered on;
a first multiplexer configured to receive the internal clock signal and a ground voltage;
a second multiplexer configured to receive an output of the first multiplexer and the ground voltage;
a control logic circuit configured to control the first multiplexer to output the ground voltage after the phase locked loop is powered on, to output the internal clock signal in response to the phase locked loop locking a phase of the internal clock signal, and to activate a buffer enable signal in response to the phase locked loop locking the phase of the internal clock signal; and
a delay circuit group configured to delay the buffer enable signal and to transfer the delayed buffer enable signal to the second multiplexer;
a reference voltage generator configured to generate a reference voltage;
a physical circuit configured to receive the first clock signal from the phase locked loop circuit, the second signal from the control circuit, and the reference voltage from the reference voltage generator, and to output a third signal based on the first clock signal, the second signal, and the reference voltage; and
a driving circuit configured to receive the reference voltage and the third signal, and to output a transmit signal based on the reference voltage and the third signal,
wherein the control circuit is operable in a high-speed mode and a low-power mode, and
wherein the control circuit is configured to power off the reference voltage generator in the low-power mode by deactivating the internal enable signal, and to power on the reference voltage generator in the high-speed mode by activating the internal enable signal.

12. The electronic device of claim 11, wherein the reference voltage generator comprises:
   a bandgap reference voltage generator configured to generate the reference voltage;
   a low pass filter configured to filter the reference voltage output from the bandgap reference voltage generator and to provide the filtered reference voltage to an output node; and
   a bypass switch configured to directly transfer the reference voltage output from the bandgap reference voltage generator to the output node in response to a control signal.

13. The electronic device of claim 12, wherein, during a first time interval of the low-power mode, the control circuit is configured to power off the bandgap reference voltage generator, and to turn off the bypass switch, and
   during a second time interval of the low-power mode, the control circuit is configured to power on the bandgap reference voltage generator, and to turn on the bypass switch.

14. The electronic device of claim 13, wherein the control circuit is further configured to turn off the bypass switch in the high-speed mode.

* * * * *